United States Patent
Kawahara et al.

(10) Patent No.: US 7,530,069 B2
(45) Date of Patent: May 5, 2009

(54) PROGRAM PARALLELIZING APPARATUS, PROGRAM PARALLELIZING METHOD, AND PROGRAM PARALLELIZING PROGRAM

(75) Inventors: Shiyouji Kawahara, Tokyo (JP); Taku Oosawa, Tokyo (JP); Satoshi Matsushita, Tokyo (JP)

(73) Assignee: NEC Corporation, Tokyo (JP)

( * ) Notice: Subject to any disclaimer, the term of this patent is extended or adjusted under 35 U.S.C. 154(b) by 540 days.

(21) Appl. No.: 11/168,736

(22) Filed: Jun. 29, 2005

(65) Prior Publication Data

US 2006/0005176 A1  Jan. 5, 2006

(30) Foreign Application Priority Data

Jun. 30, 2004  (JP) .............................. 2004-194052

(51) Int. Cl.
*G06F 9/46* (2006.01)
*G06F 9/45* (2006.01)

(52) U.S. Cl. ...................................... 718/100; 717/159
(58) Field of Classification Search .............. 718/100; 717/159
See application file for complete search history.

(56) References Cited

U.S. PATENT DOCUMENTS

| | | | |
|---|---|---|---|
| 5,712,996 A | 1/1998 | Schepers |
| 5,913,059 A | 6/1999 | Torii |
| 6,389,446 B1 | 5/2002 | Torii |
| 6,760,906 B1 | 7/2004 | Odani et al. |
| 2002/0095666 A1 | 7/2002 | Tabata et al. |
| 2003/0014471 A1 | 1/2003 | Ohsawa et al. |
| 2003/0014473 A1 | 1/2003 | Ohsawa et al. |

(Continued)

FOREIGN PATENT DOCUMENTS

EP    1 094 387 A2    10/2000

(Continued)

OTHER PUBLICATIONS

A Cost-Driven Compilation Framework for Speculative Parallelization of Sequential Programs Du et al Jun. 9-11, 2004.*

(Continued)

*Primary Examiner*—Meng-Ai An
*Assistant Examiner*—Mengyao Zhe
(74) *Attorney, Agent, or Firm*—Foley & Lardner LLP

(57) ABSTRACT

A program parallelizing apparatus, a program parallelizing method and a program parallelizing program capable of creating a parallelized program of better parallel execution performance at a high speed. A fork point determination section extracts all fork points in a sequential processing program, and removes fork points with a static boost value satisfying a static rounding condition. A fork point combination determination section obtains a dynamic boost value and an exclusive fork set for each fork point that appears when the sequential processing program is executed with input data, and removes fork points with a dynamic boost value satisfying a dynamic rounding condition. As a maximum weight independent set problem, the fork point combination determination section obtains an initial combination of fork points, which are not in an exclusive relationship, with the maximum sum of dynamic boost values, and retrieves an optimal combination based on an iterative improvement method. According to the optimal fork point combination, a parallelized program output section creates a parallelized program for a multithreading parallel processor from the sequential processing program.

8 Claims, 35 Drawing Sheets

U.S. PATENT DOCUMENTS

| | | |
|---|---|---|
| 2004/0103410 A1 | 5/2004 | Sakai |
| 2004/0194074 A1 | 9/2004 | Shibayama |

FOREIGN PATENT DOCUMENTS

| | | |
|---|---|---|
| GB | 2 381 610 A | 5/2003 |
| JP | 10-027108 | 1/1998 |
| JP | 10-27108 A | 1/1998 |
| JP | 10-078880 | 3/1998 |
| JP | 10-78880 A | 3/1998 |
| JP | 2001-117890 | 4/2001 |
| JP | 2001-282549 | 10/2001 |
| JP | 2001-282549 A | 10/2001 |
| JP | 2003-029984 | 1/2003 |
| JP | 2003-29984 A | 1/2003 |
| JP | 2003-029985 | 1/2003 |
| JP | 2003-29985 A | 1/2003 |
| JP | 2004-302706 | 10/2004 |
| JP | 2004-302706 A | 10/2004 |

OTHER PUBLICATIONS

S. Torii et al., "On-chip Control Parallel Multi-processor: MUSCAT," Journal of Information Processing Society of Japan, vol. 39:6, Jun. 15, 1998, pp. 1622-1631.

J. Sakai et al., "An automatic parallelization compiling method for control parallel architecture," 1998 Parallel Processing Symposium, vol. 98:7, Jun. 3, 1998, pp. 383-390.

JP 2004-152204A, "Parallel Compiler Device," Hitachi Ltd., abstract only.

JP 2000-207223A, "Method and Device for Program Processing for Parallel Processings, Recording Medium with Program Performing Program Processing for Parallel Processing Recorded Therein, and Recording Medium with Sequence for Parallel Processing Recorded Therein," Matsushita, abstract only.

Shoten, Asakura, "Compiler Construction and Optimization," Mar. 20, 2004, pp. 268-270 and pp. 336, 365.

Torii et al., "Control Parallel On-Chip Multi-processor: MUSCAT," Joing Symposium on Parallel Processing 1997 (JSPP'97), May 1997, pp. 229-236.

\* cited by examiner

FIG. 7
(a)
1 : mov r0, #10
2 : add r1, r0, #100
3 : mov r2, #1000
4 : ldr r3, [r2, #10]
(b) 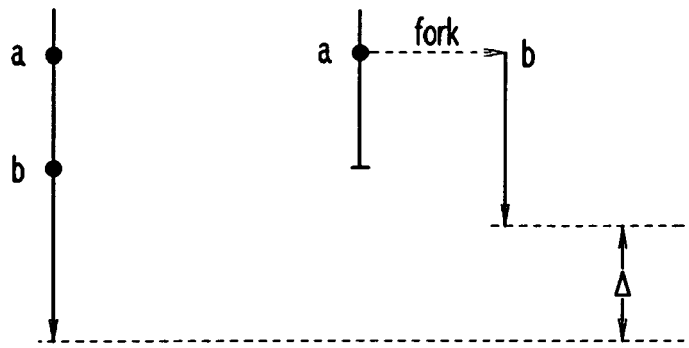
FIG. 8-1
(a) 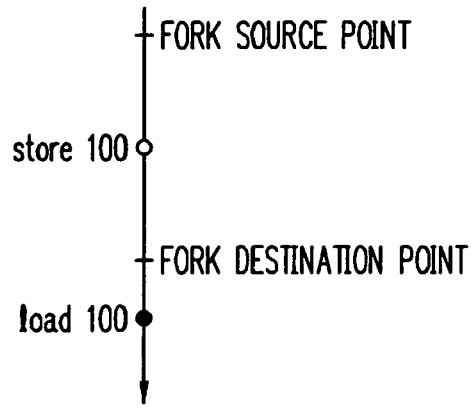
(b) 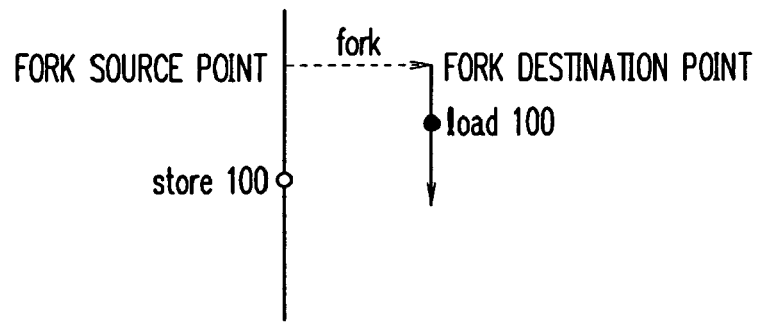

(a)

(b)

```
ld r0, 2000    # start of BB1, r0 = memory [2000] ;
ld r4, 3000
jmp MAIN       # end of BB1, jump to "MAIN"
...
MAIN :                          # start of BB2
P01 : add r0, r0, 100  # r0 = r0 + 100 ;
P02 : ld r1, [1000]
P03 : ld r2 [1100]
P04 : sub r3, r1, 200  # r3 = r1 - 200;
P05 : st r3, [1200]    # memory [1200] = r3;
P06 : mul r3,r0,r2     # r3 = r0 * r2
P07 : add r4, r4, 300
P08 : ld r2, [1300]
P09 : st r4, [1400]
P10 : add r2, r2, 400
P11 : ld r4, [1500]
P12 : add r4, r4, 500
P13 : st r4, [1600]
      ...
      add r5, r2, r3   # used r2 and r3 from preceding BB
      ...
```

(a)　(b)　(c)　(d)　(e)

(a)　(b)

F I G. 10-5

```
P01(P07) : add r4, r4, 300
P02(P09) : st r4, [1400]
P03(P01) : add r0, r0, 100
P04(P03) : ld r2, [1100]
P05(P02) : ld r1, [1000]
P06(P04) : sub r3, r1, 200
P07(P05) : st r3, [1200]
P08(P06) : mul r3, r0, r2
```

F I G. 10-6

```
P01(P07) : add r4, r4, 300
P02(P09) : st r4, [1400]
P03(P01) : add r0, r0, 100
P04(P03) : ld r2, [1100]
P05(P02) : ld r1, [1000]
P06(P04) : sub r3, r1, 200
P07(P05) : st r3, [1200]
P08(P06) : mul r3, r0, r2
P09(P11) : ld r4, [1500]
P10(P12) : add r4, r4, 500
P11(P13) : st r4, [1600]
P12(P08) : ld r2, [1300]
P13(P10) : add r2, r2, 400
```

FIG. 10-7

|  | r0 | r1 | r2 | r3 | r4 |
|---|---|---|---|---|---|
| P01 : add r0, r0, 100 | ● | | | | |
| P02 : ld r1, [1000] | | ● | | | |
| P03 : ld r2, [1100] | | | ● | | |
| P04 : sub r3, r1, 200 | | ✕ | | ● | |
| P05 : st r3, [1200] | | | | | |
| P06 : mul r3, r0, r2 | ✕ | | ✕ | ● | |
| P07 : add r4, r4, 300 | | | | | ● |
| P08 : ld r2, [1300] | | | ● | | |
| P09 : st r4, [1400] | | | | | ✕ |
| P10 : add r2, r2, 400 | | | ● | | |
| P11 : ld r4, [1500] | | | | | ● |
| P12 : add r4, r4, 500 | | | | | ● |
| P13 : st r4, [1600] | | | | | ✕ |
| ... | | | | | |

FIG. 10-8

|  | r0 | r1 | r2 | r3 | r4 |
|---|---|---|---|---|---|
| P01(P07) : add r4, r4, 300 |  |  |  |  | ● |
| P02(P09) : st r4, [1400] |  |  |  |  | × |
| P03(P01) : add r0, r0, 100 | ● |  |  |  |  |
| P04(P03) : ld r2, [1100] |  |  | ● |  |  |
| P05(P02) : ld r1, [1000] |  | ● |  |  |  |
| P06(P04) : sub r3, r1, [200] |  | × | | ● |  |
| P07(P05) : st r3, [1200] |  |  |  | | |
| P08(P06) : mul r3, r0, r2 | × |  | × | ● |  |
| P09(P11) : ld r4, [1500] |  |  |  |  | ● |
| P10(P12) : add r4, r4, 500 |  |  |  |  | ● |
| P11(P13) : st r4, [1600] |  |  |  |  | × |
| P12(P08) : ld r2, [1300] |  |  | ● |  |  |
| P13(P10) : add r2, r2, 400 |  |  | ● |  |  |
| ... |  |  |  |  |  |

FIG. 11-1
```
                    mov r0, 1000    # a = 1000 ;
                    mov r1, 1100    # b = 1100 ;
                    jmp MAIN        # jump to MAIN
                    ...
a = 1000 ;          MAIN :
b = 1100 ;          P01 : add r0, r0, 100  # a = a + 100 ;
goto MAIN ;         P02 : add r1, r1, 200  # b = b + 200 ;
...                 P03 : st r0, 40        # temporary save 'a'
MAIN : ;            P04 : ld r0, 44        # load 'c'
  a = a + 100 ;     P05 : add r1, r0, r1   # b = b + c ;
  b = b + 200 ;     P06 : st r1, 48        # save 'b'
  b = b + c ;       P07 : ld r1, 40        # restore 'a'
  a = a + d ;       P08 : ld r0, 52        # load 'd'
...                 P09 : add r1, r0, r1   # a = a + d ;
                    ...
```
FIG. 11-2
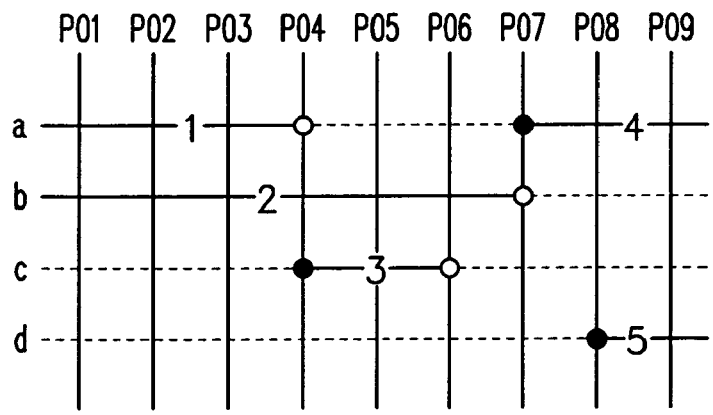
FIG. 11-3
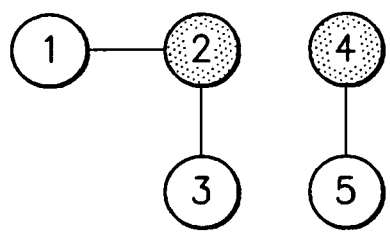

FIG. 11-4
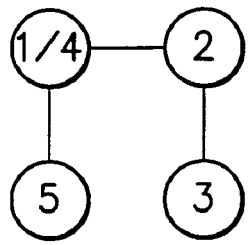
FIG. 11-5
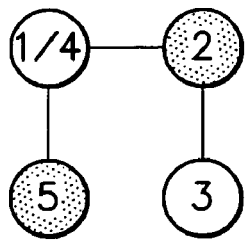
FIG. 11-6
```
mov r0, 1000      # a = 1000 ;
mov r1, 1100      # b = 1100 ;
jmp MAIN          # jump to MAIN
...
MAIN :
P01 : add r0, r0, 100  # a = a + 100 ;
P02 : add r1, r1, 200  # b = b + 200 ;
P03 : st r0, 40        # temporary save 'a'
P04 : ld r0, 44        # load 'c'
P05 : add r1, r0, r1   # b = b + c ;
P06 : st r1, 48        # save 'b'
P07 : ld r0, 40        # restore 'a'
P08 : ld r1, 52        # load 'd'
P09 : add r0, r0, r1   # a = a + d ;
...
```

F I G. 12
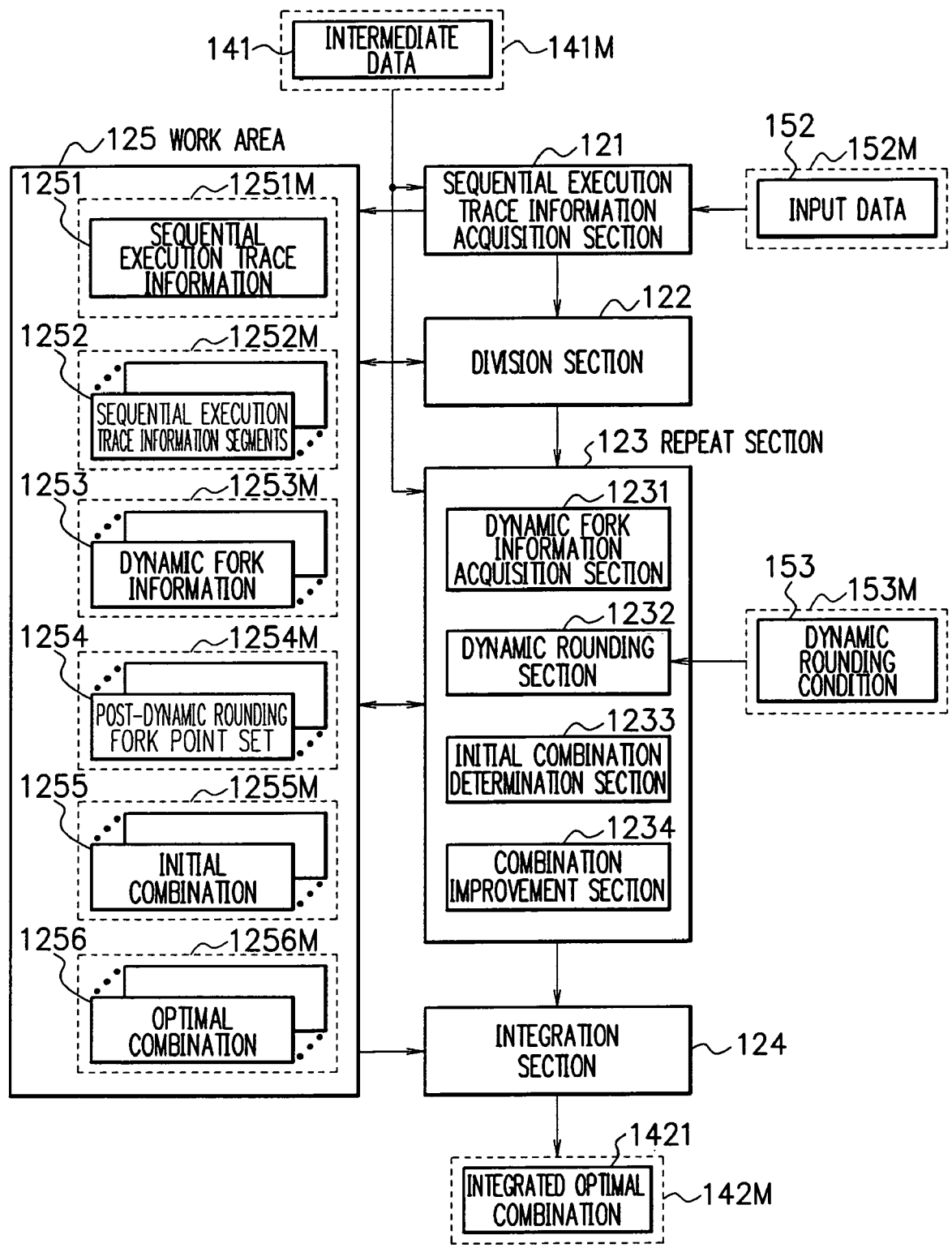

F I G. 13
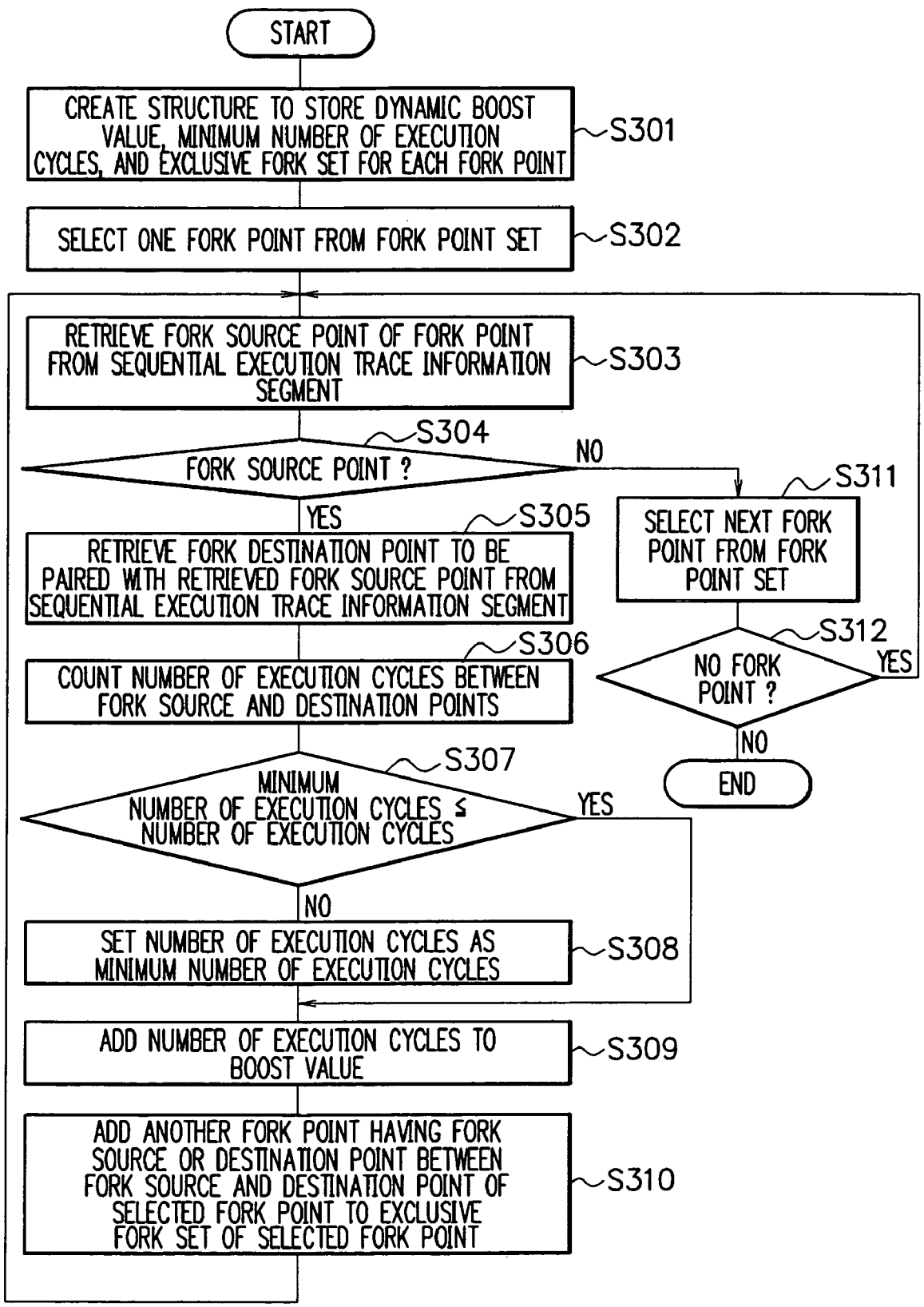

F I G. 16
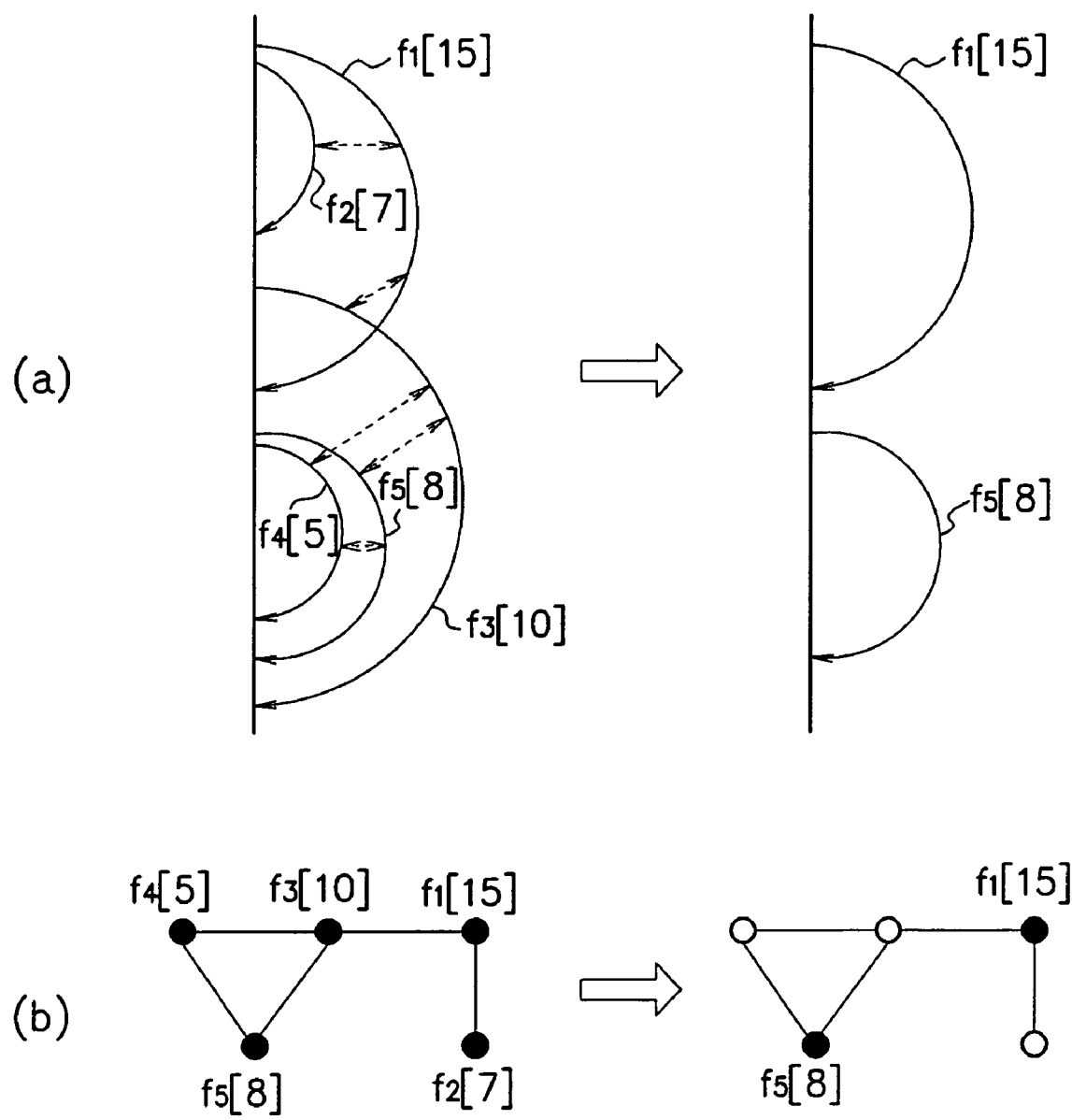

F I G. 20
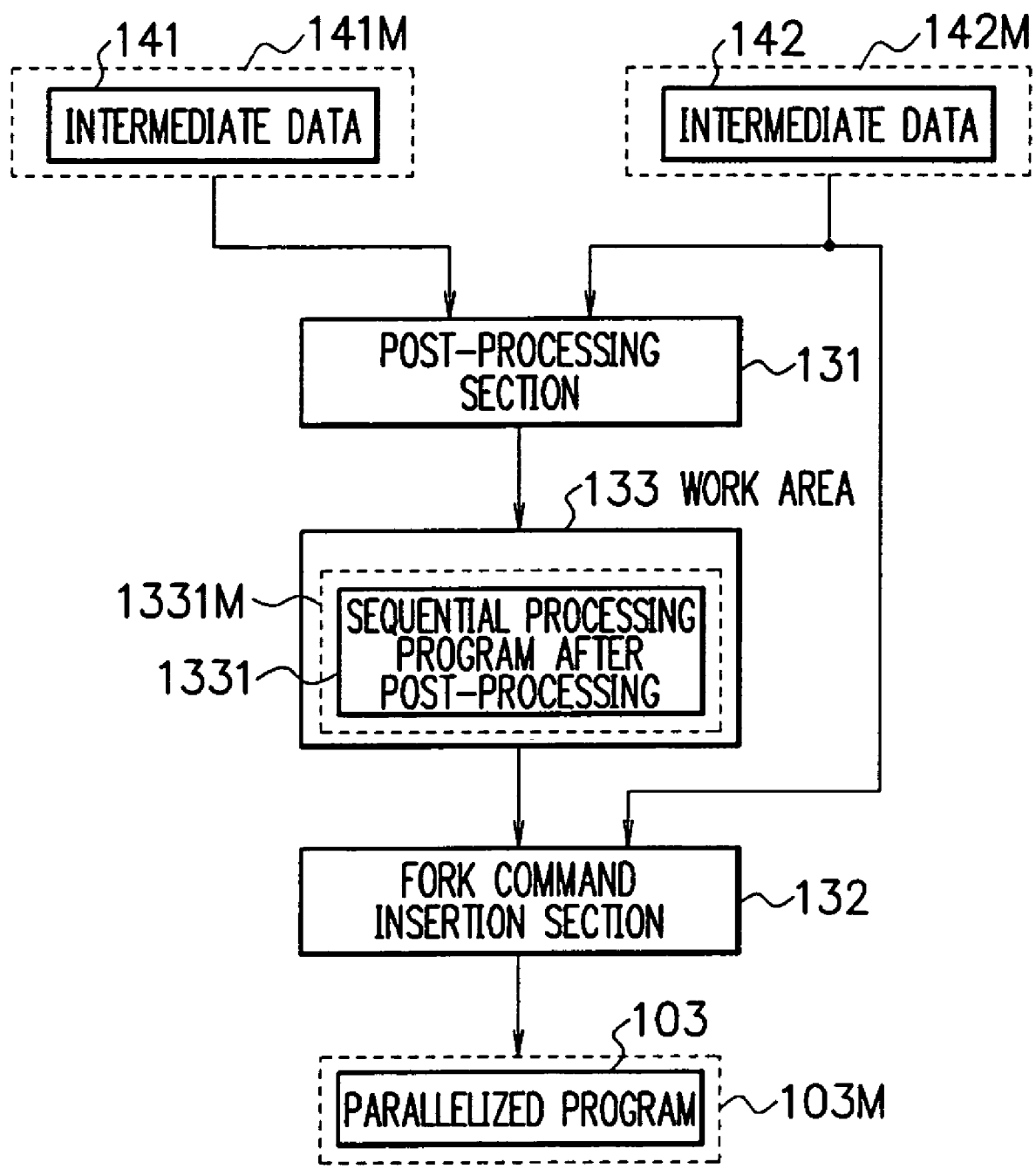

PROGRAM PARALLELIZING APPARATUS, PROGRAM PARALLELIZING METHOD, AND PROGRAM PARALLELIZING PROGRAM

BACKGROUND OF THE INVENTION

1. Field of the Invention

The present invention relates to a program parallelizing apparatus, a program parallelizing method and a program parallelizing program for creating a parallelized program for a multithreading parallel processor from a sequential processing program.

2. Description of the Prior Art

As a method of processing a single sequential processing program in parallel in a parallel processor system, there has been known a multithreading method in which a program is divided into instruction streams called threads and executed in parallel by a plurality of processors. Reference is made to it in, for example, Japanese Patent Application laid open No. HEI10-27108 (hereinafter referred to as Reference 1), No. HEI10-78880 (Reference 2), No. 2003-029985 (Reference 3), No. 2003-029984 (Reference 4), and "Proposal for On Chip Multiprocessor-oriented Control Parallel Architecture MUSCAT", Joint Symposium on Parallel Processing JSPP97, Information Processing Society of Japan, pp. 229-236, May 1997 (Reference 5). A parallel processor that executes multiple threads is called a multithreading parallel processor. In the following, a description will be given of conventional multithreading methods and multithreading parallel processors.

Generally, in a multithreading method and a multithreading parallel processor, to create a new thread on another processor is called "thread forking". A thread that performs a fork is a parent thread, while a thread newly created from the parent thread is a child thread. The program location where a thread is forked will be referred to as a fork source address or a fork source point. The program location at the beginning of a child thread will be referred to as a fork destination address, a fork destination point, or a child thread start point. In the aforementioned References, a fork command is inserted at the fork source point to instruct the forking of a thread. The fork destination address is specified in the fork command. When the fork command is executed, child thread that starts at the fork destination address is created on another processor, and then the child thread is executed. A program location where the processing of a thread is to be ended is called a terminal (term) point, at which each processor finishes processing the thread.

FIG. 1 shows an outline of the processing conducted by a multithreading parallel processor in a multithreading method. FIG. 1 (a) shows a sequential processing program divided into three threads A, B and C. When the program is processed in a single processor, one processor element sequentially processes threads A, B and C as shown in FIG. 1 (b). In contrast, according to a multithreading method in a multithreading parallel processor described in the above References, as shown in FIG. 1 (c), thread A is executed by processor PE1, and, while processor PE1 is executing thread A, thread B is generated on another processor PE2 by a fork command embedded in thread A, and thread B is executed by processor PE2. Processor PE2 generates thread C on processor PE3 by a fork command embedded in thread B. Processors PE1 and PE2 finish processing the threads at terminal points immediately before the start points of threads B and C, respectively. Having executed the last command of thread C, processor PE3 executes the next command (usually a system call command). As just described, by concurrently executing threads in a plurality of processors, performance can be improved as compared with the sequential processing.

There is another multithreading method, as shown in FIG. 1 (d), in which forks are performed several times by the processor PE1 that is executing thread A to create threads B and C on processors PE2 and PE3, respectively. In contrast to the processing model or multithreading method of FIG. 1 (d), that of FIG. 1 (c) is restricted in such a manner that a thread can create a valid child thread only once while the thread is alive. This model is called a fork-one model. The fork-one model substantially simplifies the management of threads. Consequently, a thread managing unit can be implemented by hardware of practical scale. Further, each processor can create a child thread on only one other processor, and therefore, multithreading can be achieved by a parallel processor system in which adjacent processors are connected unidirectionally in a ring form.

There is a commonly known method that can be used in the case where no processor is available on which to create a child thread when a processor is to execute a fork command. That is, the processor waits to execute the fork command until a processor on which a child thread can be created becomes available. Besides, in Reference 4, there is described another method in which the processor invalidates or nullifies the fork command to continuously execute instructions subsequent to the fork command and then executes instructions of the child thread.

For a parent thread to create a child thread such that the child thread performs predetermined processing, the parent thread is required to pass to the child thread the value of a register, at least necessary for the child thread, in a register file at the fork point of the parent thread. To reduce the cost of data transfer between the threads, in References 2 and 6, a register value inheritance mechanism used at thread creation is provided through hardware. With this mechanism, the contents of the register file of a parent thread is entirely copied into a child thread at thread creation. After the child thread is produced, the register values of the parent and child threads are changed or modified independently of each other, and no data is transferred therebetween through registers. As another conventional technique concerning data passing between threads, there has been proposed a parallel processor system provided with a mechanism to individually transfer a register value for each register by a command.

In the multithreading method, basically, previous threads whose execution has been determined are executed in parallel. However, in actual programs, it is often the case that not enough threads can be obtained, whose execution has been determined. Additionally, the parallelization ratio may be low due to dynamically determined dependencies, limitation of the analytical capabilities of the compiler and the like, and desired performance cannot be achieved. Accordingly, in Reference 1, control speculation is adopted to support the speculative execution of threads through hardware. In the control speculation, threads with a high possibility of execution are speculatively executed before the execution is determined. The thread in the speculative state is temporarily executed to the extent that the execution can be cancelled via hardware. The state in which a child thread performs temporary execution is referred to as temporary execution state. When a child thread is in the temporary execution state, a parent thread is said to be in the temporary thread creation state. In the child thread in the temporary execution state, writing to a shared memory and a cache memory is restrained, and data is written to a temporary buffer additionally provided. When it is confirmed that the speculation is correct, the parent thread sends a speculation success notification to the child thread. The child thread reflects the contents of the temporary buffer in the shared memory and the cache memory, and then returns to the ordinary state in which the temporary buffer is not used. The parent thread changes from the temporary thread creation to thread creation state. On the other hand, when failure of the speculation is confirmed, the parent thread executes a thread abort command "abort" to cancel the execution of the child thread and subsequent threads. The parent thread changes from the temporary thread creation to non-thread creation state. Thereby, the parent thread can generate a child thread again. That is, in the fork-one model, although the thread creation can be carried out only once, if control speculation is performed and the speculation fails, a fork can be performed again. Also in this case, only one valid child thread can be produced.

To implement the multithreading of the fork-one model, in which a thread creates a valid child thread at most once in its lifetime, for example, the technique described in Reference 5 places restrictions on the compilation for creating a parallelized program from a sequential processing program so that every thread is to be a command code to perform a valid fork only once. In other words, the fork-once limit is statically guaranteed on the parallelized program. On the other hand, according to Reference 3, from a plurality of fork commands in a parent thread, one fork command to create a valid child thread is selected during the execution of the parent thread to thereby guarantee the fork-once limit at the time of program execution.

A description will now be given of the prior art to generate a parallel program for a parallel processor to implement multithreading.

As can be seen in FIG. 2, a conventional program parallelizing apparatus 10 receives a sequential processing program 13. A control/data flow analyzer 11 analyzes the control and data flow of the program 13. Based on the results of the analysis, a fork inserter 12 determines a basic block or a plurality of basic blocks as a unit or units of parallelization, that is, the locations of respective conditional branch instructions as candidate fork points. Referring to the analysis results of the data and control flow, the fork inserter 12 places a fork command at each fork point which leads to higher parallel execution performance. The fork inserter 12 divides the program into a plurality of threads to produce a parallelized program 14.

In conjunction with FIG. 2, a description has been given of the program parallelizing apparatus 10 which produces the parallelized program 14 from the sequential processing program 13 created by a sequential compiler. Further, as described in Japanese Patent Application laid open No. 2001-282549 (Reference 6), there is known another technique in which a program written in a high level language is processed to produce a target program for a multithreading parallel processor. Besides, due to the influence of program execution flow and memory dependencies which can be determined only at program execution time, the fork insertion method based on static analysis may not obtain desired parallel execution performance. To cope with the disadvantage, there has been employed a technique as described in Reference 6 in which fork points are determined by referring to profile information such as a conditional branch probability and a data dependence occurrence frequency at the time of sequential execution. Also in this case, the locations of conditional branch instructions are used as candidate fork points.

However, the prior art has a problem that, when fork points with better parallel execution performance are desired, the process to determine the fork points takes a longer time for the following reason. As the number of candidate fork points is increased to obtain fork points with better parallel execution performance, the time taken to determine an optimal combination of fork points becomes longer.

SUMMARY OF THE INVENTION

It is therefore an object of the present invention to provide a program parallelizing apparatus and a program parallelizing method capable of creating a parallelized program of better parallel execution performance at a high speed.

In accordance with the first aspect of the present invention, to achieve the object mentioned above, there is provided a program parallelizing apparatus for receiving a sequential processing program as input and producing a parallelized program for a multithreading parallel processor. The program parallelizing apparatus comprises a fork point determination section for analyzing the sequential processing program to determine a set of fork points in the program, a fork point combination determination section for determining an optimal combination of fork points included in the fork point set determined by the fork point determination section, and a parallelized program output section for creating a parallelized program for a multithreading parallel processor based on the optimal combination of fork points determined by the fork point combination determination section. In the case where a fork point appears n times when the sequential processing program is executed with particular input data and there are obtained $C_1, C_2, \ldots,$ and $C_n$ each representing the number of execution cycles from the fork source to fork destination point of the fork point at each appearance, the sum of $C_1, C_2, \ldots,$ and $C_n$ is defined as a dynamic boost value, while a set of other fork points which are not available concurrently with the fork point is defined as an exclusive fork set of the fork point. The fork point combination determination section includes a dynamic fork information acquisition section for obtaining a dynamic boost value and an exclusive fork set for each fork point when the sequential processing program is executed with particular input data, a storage for storing the dynamic boost value and the exclusive fork set for each fork point, and a combination determination section for creating, by referring to the storage, a combination of fork points, which are not in an exclusive relationship, with the maximum sum of dynamic boost values.

In accordance with the second aspect of the present invention, in the program parallelizing apparatus of the first aspect, the combination determination section includes a section for creating a weighted graph in which each fork point in the fork point set represents a node, an edge connects fork points in an exclusive relationship, and each node is weighted by the dynamic boost value of a fork point corresponding to the node, a section for obtaining a maximum weight independent set of the weighted graph, and a section for obtaining a set of fork points corresponding to nodes included in the maximum weight independent set to output the fork point set as a combination of fork points, which are not in an exclusive relationship, with the maximum sum of dynamic boost values.

In accordance with the third aspect of the present invention, in the program parallelizing apparatus of the second aspect, the fork point combination determination section further includes a combination improvement section for retrieving a combination of fork points with better parallel execution performance based on an iterative improvement method using the combination determined by the combination determination section as an initial solution.

In accordance with the fourth aspect of the present invention, there is provided a program parallelizing apparatus for receiving a sequential processing program as input and producing a parallelized program for a multithreading parallel processor. The program parallelizing apparatus comprises a fork point determination section for analyzing the sequential processing program to determine a set of fork points in the program, a rounding section for obtaining the rate of contribution to parallel execution performance with respect to each fork point included in the fork point set determined by the fork point determination section and removing fork points with a contribution rate that satisfies a predetermined rounding condition from the fork point set, a fork point combination determination section for determining an optimal combination of fork points included in the fork point set after the rounding by the rounding section, and a parallelized program output section for creating a parallelized program for a multithreading parallel processor from the sequential processing program based on the optimal combination of fork points determined by the fork point combination determination section.

In accordance with the fifth aspect of the present invention, in the program parallelizing apparatus of the fourth aspect, the rounding section includes a storage for storing the fork point set determined by the fork point determination section, a calculator for obtaining the rate of contribution to parallel execution performance with respect to each fork point included in the fork point set, a storage for storing the rate of contribution to parallel execution performance obtained by the calculator with respect to each fork point included in the fork point set, and a storage for storing a rounding condition. The rounding section compares the contribution rate obtained by the calculator with respect to each fork point included in the fork point set with the rounding condition to remove fork points satisfying the rounding condition.

In accordance with the sixth aspect of the present invention, in the program parallelizing apparatus of the fourth or fifth aspect, when the total weight of all instructions from the fork source to fork destination point of a fork point is defined as the static boost value of the fork point, the static boost value is used as the rate of contribution to parallel execution performance.

In accordance with the seventh aspect of the present invention, in the program parallelizing apparatus of the sixth aspect, the rounding condition includes an upper limit threshold value, and the rounding section removes fork points with a static boost value exceeding the upper limit threshold value.

In accordance with the eighth aspect of the present invention, in the program parallelizing apparatus of the sixth aspect, the rounding condition includes a lower limit threshold value, and the rounding section removes fork points with a static boost value less than the lower limit threshold value.

In accordance with the ninth aspect of the present invention, in the program parallelizing apparatus of the fourth or fifth aspect, in the case where a fork point appears n times when the sequential processing program is executed with particular input data and there are obtained $C_1, C_2, \ldots,$ and $C_n$ each representing the number of execution cycles from the fork source to fork destination point of the fork point at each appearance, and where the smallest number among $C_1, C_2, \ldots,$ and $C_n$ is defined as the minimum number of execution cycles of the fork point, the minimum number of execution cycles is used as the rate of contribution to parallel execution performance.

In accordance with the tenth aspect of the present invention, in the program parallelizing apparatus of the ninth aspect, the rounding condition includes an upper limit threshold value, and the rounding section removes fork points with the minimum number of execution cycles more than the upper limit threshold value.

In accordance with the eleventh aspect of the present invention, in the program parallelizing apparatus of the fourth or fifth aspect, in the case where a fork point appears n times when the sequential processing program is executed with particular input data and there are obtained $C_1, C_2, \ldots,$ and $C_n$ each representing the number of execution cycles from the fork source to fork destination point of the fork point at each appearance, and where the sum of $C_1, C_2, \ldots,$ and $C_n$ is defined as a dynamic boost value of the fork point, the dynamic boost value is used as the rate of contribution to parallel execution performance.

In accordance with the twelfth aspect of the present invention, in the program parallelizing apparatus of the eleventh aspect, the rounding condition includes a lower limit threshold value, and the rounding section removes fork points with a dynamic boost value less than the lower limit threshold value.

In accordance with the thirteenth aspect the present invention, there is provided a program parallelizing method. The program parallelizing method comprises the steps of a) analyzing, by a fork point determination section, a sequential processing program to determine a set of fork points in the program, b) determining, by a fork point combination determination section, an optimal combination of fork points included in the fork point set determined by the fork point determination section, and c) creating, by a parallelized program output section, a parallelized program for a multithreading parallel processor based on the optimal combination of fork points determined by the fork point combination determination section. In the case where a fork point appears n times when the sequential processing program is executed with particular input data and there are obtained $C_1, C_2, \ldots,$ and $C_n$ each representing the number of execution cycles from the fork source to fork destination point of the fork point at each appearance, and where the sum of $C_1, C_2, \ldots,$ and $C_n$ is defined as the dynamic boost value, while a set of other fork points which are not available concurrently with the fork point is defined as an exclusive fork set of the fork point, the step b includes the steps of b-1) obtaining, by a dynamic fork information acquisition section, a dynamic boost value and an exclusive fork set for each fork point when the sequential processing program is executed with particular input data, b-2) storing the dynamic boost value and the exclusive fork set for each fork point in a storage, and b-3) creating, by a combination determination section, a combination of fork points, which are not in an exclusive relationship, with the maximum sum of dynamic boost values by referring to the storage.

In accordance with the fourteenth aspect the present invention, in the program parallelizing method of the thirteenth aspect, the step b-3 includes the steps of creating a weighted graph in which each fork point in the fork point set represents a node, an edge connects fork points in an exclusive relationship, and each node is weighted by the dynamic boost value of a fork point corresponding to the node, obtaining a maximum weight independent set of the weighted graph, and obtaining a set of fork points corresponding to nodes included in the maximum weight independent set to output the fork point set as a combination of fork points, which are not in an exclusive relationship, with the maximum sum of dynamic boost values.

In accordance with the fifteenth aspect of the present invention, in the program parallelizing method of the fourteenth aspect, the step b further includes the step of retrieving a combination of fork points with better parallel execution performance based on an iterative improvement method using the combination determined in step b-3 as an initial solution.

In accordance with the sixteenth aspect of the present invention, there is provided a program parallelizing method. The program parallelizing method comprises the steps of a) analyzing, by a fork point determination section, the sequential processing program to determine a set of fork points in the program, b) obtaining, by a rounding section, the rate of contribution to parallel execution performance with respect to each fork point included in the fork point set determined by the fork point determination section and removing fork points with a contribution rate that satisfies a predetermined rounding condition from the fork point set, c) determining, by a fork point combination determination section, an optimal combination of fork points included in the fork point set after the rounding by the rounding section, and d) creating, by a parallelized program output section, a parallelized program for a multithreading parallel processor from the sequential processing program based on the optimal combination of fork points determined by the fork point combination determination section.

In accordance with the seventeenth aspect of the present invention, in the program parallelizing method of the sixteenth aspect, the step c includes the steps of c-1) storing the fork point set determined by the fork point determination section in a storage, c-2) obtaining, by a calculator, the rate of contribution to parallel execution performance with respect to each fork point included in the fork point set, c-3) storing the rate of contribution to parallel execution performance obtained by the calculator with respect to each fork point included in the fork point set, and c-4) reading the rounding condition from a storage, comparing the contribution rate obtained by the calculator with respect to each fork point included in the fork point set with the rounding condition, and removing fork points satisfying the rounding condition.

In accordance with the eighteenth aspect of the present invention, in the program parallelizing method of the sixteenth or seventeenth aspect, when the total weight of all instructions from the fork source to fork destination point of a fork point is defined as the static boost value of the fork point, the static boost value is used as the rate of contribution to parallel execution performance.

In accordance with the nineteenth aspect of the present invention, in the program parallelizing method of the eighteenth aspect, the rounding condition includes an upper limit threshold value, and the rounding section removes fork points with a static boost value exceeding the upper limit threshold value.

In accordance with the twentieth aspect of the present invention, in the program parallelizing method of the eighteenth aspect, the rounding condition includes a lower limit threshold value, and the rounding section removes fork points with a static boost value less than the lower limit threshold value.

In accordance with the twenty-first aspect of the present invention, in the program parallelizing method of the sixteenth or seventeenth aspect, in the case where a fork point appears n times when the sequential processing program is executed with particular input data and there are obtained $C_1$, $C_2, \ldots,$ and $C_n$ each representing the number of execution cycles from the fork source to fork destination point of the fork point at each appearance, and where the smallest number among $C_1, C_2, \ldots,$ and $C_n$ is defined as the minimum number of execution cycles of the fork point, the minimum number of execution cycles is used as the rate of contribution to parallel execution performance.

In accordance with the twenty-second aspect of the present invention, in the program parallelizing method of the twenty-first aspect, the rounding condition includes an upper limit threshold value, and the rounding section removes fork points with the minimum number of execution cycles more than the upper limit threshold value.

In accordance with the twenty-third aspect of the present invention, in the program parallelizing method of the sixteenth or seventeenth aspect, in the case where a fork point appears n times when the sequential processing program is executed with particular input data and there are obtained $C_1$, $C_2, \ldots,$ and $C_n$ each representing the number of execution cycles from the fork source to fork destination point of the fork point at each appearance, and where the sum of $C_1$, $C_2, \ldots,$ and $C_n$ is defined as a dynamic boost value of the fork point, the dynamic boost value is used as the rate of contribution to parallel execution performance.

In accordance with the twenty-fourth aspect of the present invention, in the program parallelizing method of the twenty-third aspect, the rounding condition includes a lower limit threshold value, and the rounding section removes fork points with a dynamic boost value less than the lower limit threshold value.

As is described above, in accordance with the present invention, the fork point combination determination section creates a combination of fork points, which are not in an exclusive relationship, with the maximum sum of dynamic boost values from the fork points in the fork point set. The combination approximates the optimal combination. Therefore, with the combination as an initial solution, the time taken to find a fork point combination with better parallel execution performance based on an iterative improvement method can be remarkably reduced.

In addition, the rounding section removes fork points less contributing to parallel execution performance at an early stage of processing. Consequently, the time required for subsequent processing such as to find the optimal fork point combination is reduced.

Thus, a parallelized program with high parallel execution performance can be produced at a high speed.

BRIEF DESCRIPTION OF THE DRAWINGS

The objects and features of the present invention will become more apparent from the consideration of the following detailed description taken in conjunction with the accompanying drawings in which:

FIG. 3-1 is a block diagram showing a program parallelizing apparatus according to the first embodiment of the present invention;

FIG. 3-2 is a flowchart showing the operation of the program parallelizing apparatus according to the first embodiment of the present invention;

FIG. 7 is a diagram to explain static boost values at fork points;

FIG. 8-1 is a diagram to explain static rounding condition 2 to remove fork points with a static boost value exceeding upper limit threshold value Ns;

FIG. 8-2 is another diagram to explain static rounding condition 2 to remove fork points with a static boost value exceeding upper limit threshold value Ns;

FIG. 10-1 is a diagram showing an example of a program before instruction relocation;

FIG. 10-2 is a flowchart showing the flow of program control before instruction relocation;

FIG. 10-3 is a diagram showing a directed acyclic graph, paying attention only to RAW in a program before instruction relocation;

FIG. 10-4 is a diagram showing a directed acyclic graph, paying attention to all data dependencies (RAW, WAR, WAW) in a program before instruction relocation;

FIG. 10-5 is a diagram showing a program during instruction relocation;

FIG. 10-6 is a diagram showing a program after instruction relocation;

FIG. 10-7 is a diagram showing register lifetime and writing operation in a sequence of instructions before instruction relocation;

FIG. 10-8 is a diagram showing register lifetime and writing operation in a sequence of instructions after instruction relocation;

FIG. 11-1 is a diagram showing an example of a program before register allocation change;

FIG. 11-2 is a diagram showing the period of time from when variables (a to d) used in a source program are allocated to registers in a target program to when the variables become unnecessary;

FIG. 11-3 is a diagram showing an example of a register interference graph;

FIG. 11-4 is a diagram showing a register interference graph in which a plurality of nodes are merged;

FIG. 11-5 is a diagram showing a graph obtained by coloring a register interference graph based on a solution of the k-coloring problem;

FIG. 11-6 is a diagram showing a target program in which register allocation is changed;

FIG. 12 is a block diagram showing a fork point combination determination section in the program parallelizing apparatus according to the first embodiment of the present invention;

FIG. 13 is a flowchart showing an example of the operation of a dynamic fork information acquisition section in the program parallelizing apparatus according to the first embodiment of the present invention;

FIG. 16 is a diagram schematically showing that the problem to obtain an optimal fork point combination from a set of fork points is translated into a maximum weight independent set problem;

FIG. 17-1 is a diagram showing an example of a weighted graph;

FIG. 17-2 is a diagram schematically showing a process to find a maximum weight independent set of a weighted graph;

FIG. 17-3 is a diagram schematically showing another process to find a maximum weight independent set of a weighted graph;

FIG. 17-4 is a diagram schematically showing yet another process to find a maximum weight independent set of a weighted graph;

FIG. 19-1 is a flowchart showing an example of the operation of an integration section in the program parallelizing apparatus according to the first embodiment of the present invention;

FIG. 19-2 is a flowchart showing another example of the operation of the integration section in the program parallelizing apparatus according to the first embodiment of the present invention;

FIG. 19-3 is a flowchart showing yet another example of the operation of the integration section in the program parallelizing apparatus according to the first embodiment of the present invention;

FIG. 20 is a block diagram showing a parallelized program output section in the program parallelizing apparatus according to the first embodiment of the present invention;

FIG. 21-1 is a block diagram showing a program parallelizing apparatus according to the second embodiment of the present invention;

FIG. 21-2 is a flowchart showing the operation of the program parallelizing apparatus according to the second embodiment of the present invention;

FIG. 22-1 is a block diagram showing a program parallelizing apparatus according to the third embodiment of the present invention;

FIG. 22-2 is a flowchart showing the operation of the program parallelizing apparatus according to the third embodiment of the present invention;

FIG. 23-1 is a block diagram showing a program parallelizing apparatus according to the fourth embodiment of the present invention;

FIG. 23-2 is a flowchart showing the operation of the program parallelizing apparatus according to the fourth embodiment of the present invention;

FIG. 24-1 is a block diagram showing a program parallelizing apparatus according to the fifth embodiment of the present invention; and FIG. 24-2 is a flowchart showing the operation of the program parallelizing apparatus according to the fifth embodiment of the present invention.

DESCRIPTION OF THE PREFERRED EMBODIMENTS

Figure 1:
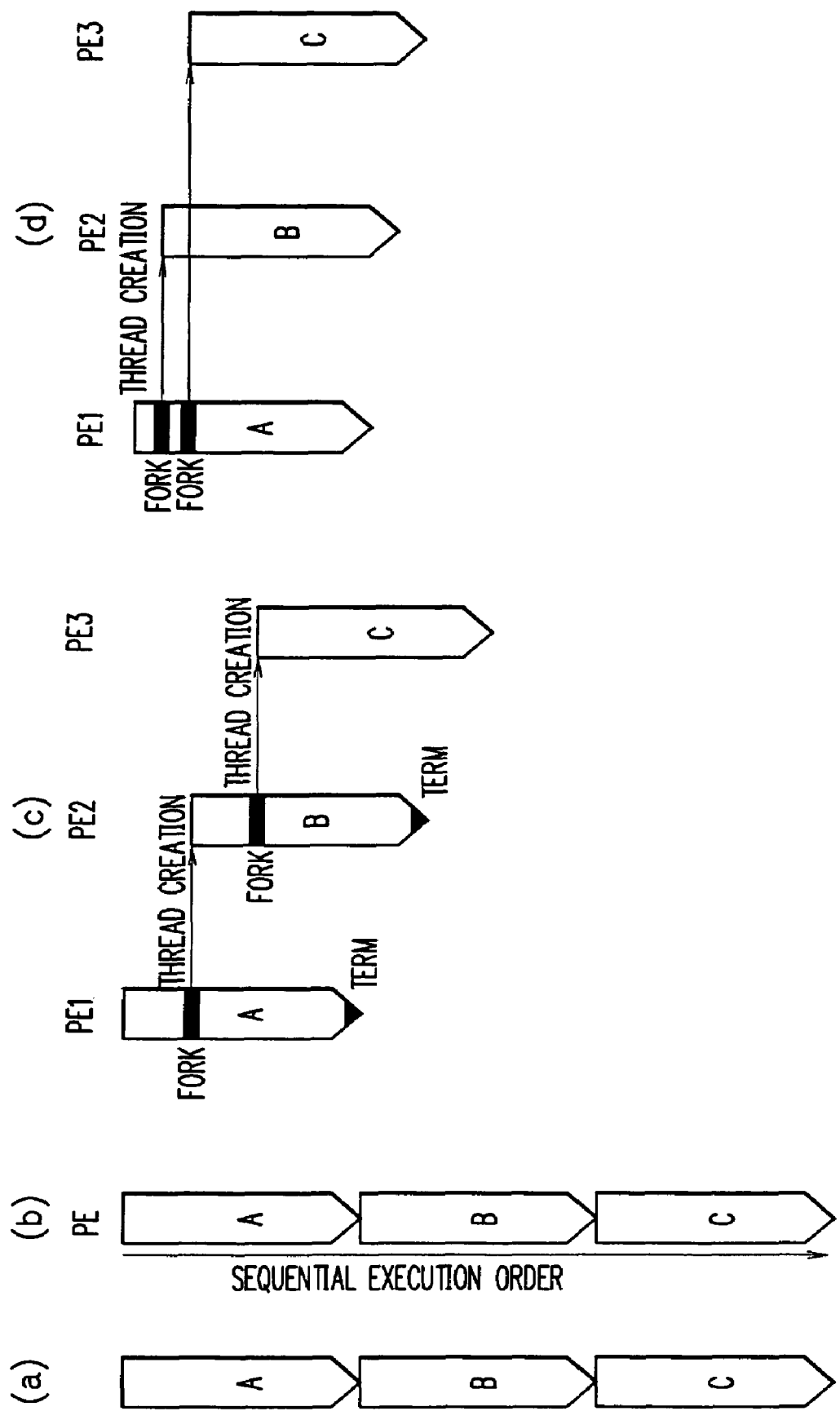
FIG. 1 is a schematic diagram to explain an outline of a multithreading method.

Referring now to the drawings, a description of preferred embodiments of the present invention will be given in detail.

First Embodiment

Figures 1, 3:
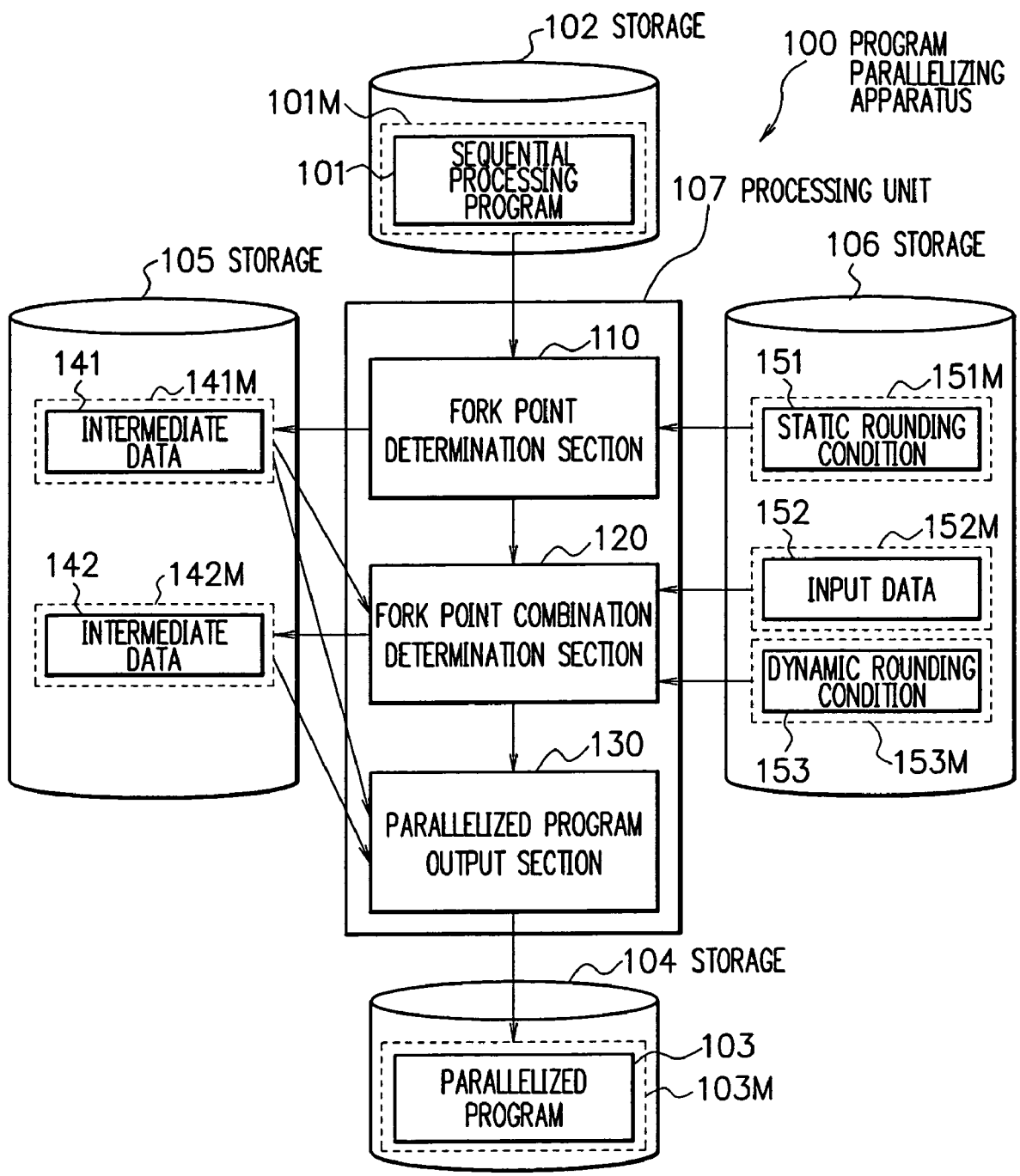
Figures 2, 3:
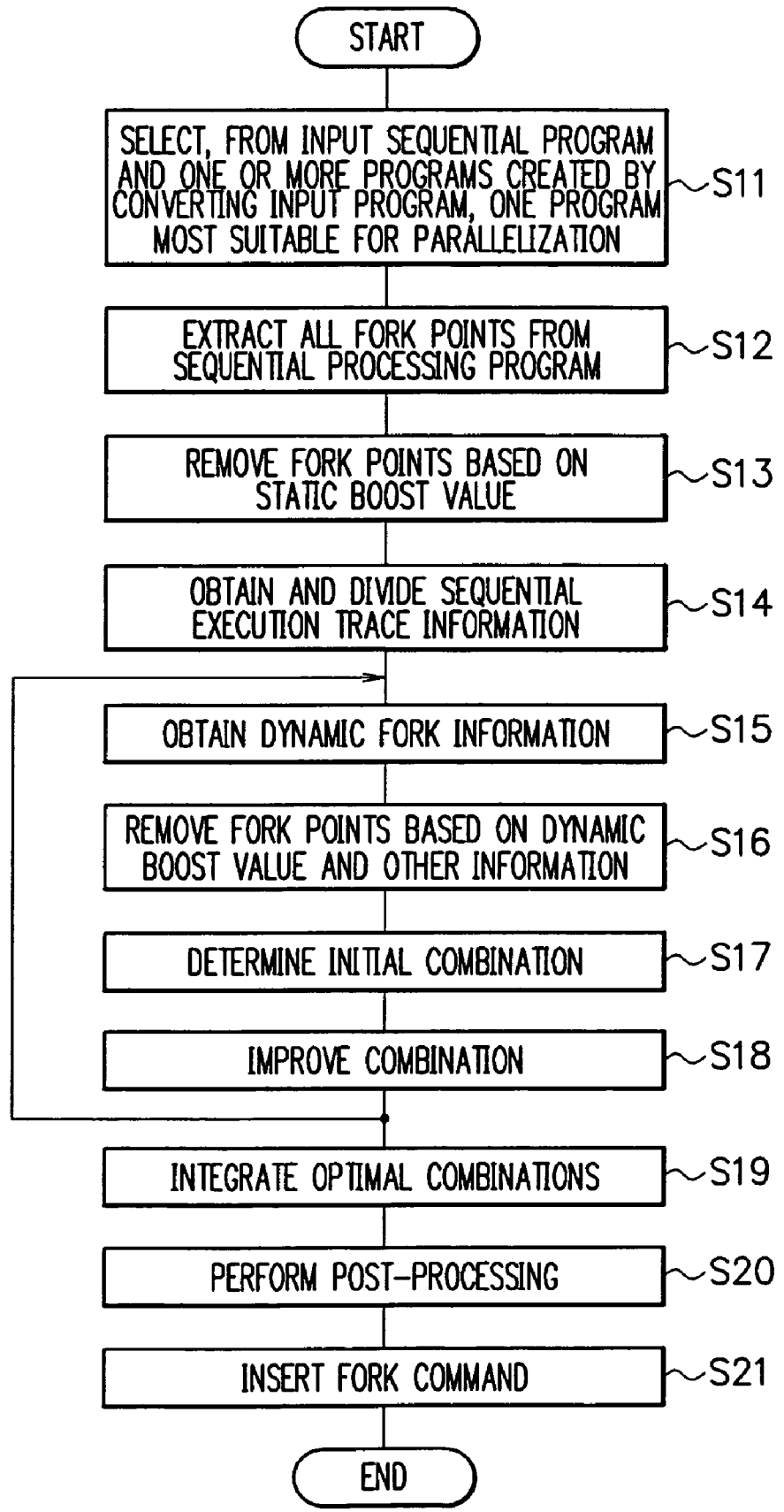

FIG. 3-1 shows a program parallelizing apparatus 100 according to the first embodiment of the present invention.

The program parallelizing apparatus 100 receives as input a sequential processing program 101 in a machine language instruction format produced by a sequential compiler (not shown), and creates a parallelized program 103 for a multi-threading parallel processor. The program parallelizing apparatus 100 includes a storage 102 to store the sequential processing program 101, a storage 104 to store the parallelized program 103, a storage 105 to store various types of data generated in the process of converting the program 101 to the program 103, a storage 106 to store predetermined types of data used during the process to convert the program 101 to the program 103, and a processing unit 107 such as a central processing unit (CPU) connected to the storages 102, 104, 105, and 106. As an example of each of the storages may be cited a magnetic disk. The processing unit 107 includes a fork point determination section 110, a fork point combination determination section 120, and a parallelized program output section 130.

The program parallelizing apparatus 100 of this kind can be implemented by a computer such as a personal computer or a workstation and a program. The program is recorded on a computer readable storage medium including a magnetic disk. For example, the computer reads the program from the storage when started up. The program controls the overall operation of the computer to thereby implement functional units such as the fork point determination section 110, the fork point combination determination section 120, and the parallelized program output section 130.

The fork point determination section 110 receives the sequential processing program 101 from a storage unit 101M of the storage 102, analyzes the program 101, and determines a sequential processing program suitable for parallelization and a set of fork points to write the results as intermediate data 141 to a storage unit 141M of the storage 105. Preferably, the fork point determination section 110 converts an instruction sequence in part of the sequential processing program 101 into another instruction sequence equivalent thereto to produce at least one sequential processing program. For each of the sequential processing program 101 and one or more programs obtained by the program conversion, the fork point determination section 110 obtains a set of fork points satisfying a predetermined fork point condition and an index of parallel execution performance with respect to the fork point set to select a sequential processing program and a fork point set with the best performance index. More preferably, from the fork points in the selected fork point set, the fork point determination section 110 removes those with a static boost value satisfying a static rounding condition 151 previously stored in a storage unit 151M of the storage 106. The set of fork points determined by the fork point determination section 110 includes fork points in an exclusive relationship where forks cannot be performed at the same time.

Examples of the program conversion include instruction relocation or rearrangement in the sequential processing program, register allocation change, and the combination thereof.

The aforementioned fork source point condition may be as follows: "in block B in the program, if no writing is performed for registers alive at the exit of B, the entry of B is a fork source point and the exit of B is a fork destination point" (hereinafter referred to as fork point condition 1). Fork point condition 1 may be relaxed as follows: "in block B in the program, assuming that registers alive at the entry of B are Ah and those alive at the exit of B are At, if Ah ⊇ At and Ah are equal in value to At, the entry of B is a fork source point and the exit of B is a fork destination point" (hereinafter referred to as fork point condition 2).

The index of parallel execution performance may be the sum of static boost values of respective fork points contained in a fork point set or the total number of fork points contained therein. The static boost value of a fork point indicates the total weight of all instructions from the fork source to fork destination point of the fork point. The instruction weight becomes larger as the number of execution cycles increases.

The fork point combination determination section 120 receives as input the intermediate data 141, determines an optimal combination of fork points included in the fork point set obtained by the fork point determination section 110, and writes the result as intermediate data 142 in a storage unit 142M of the storage 105. Preferably, the fork point combination determination section 120 uses sequential execution trace information obtained while the sequential processing program suitable for parallelization determined by the fork point determination section 110 is being executed according to input data 152 previously stored in a storage unit 152M of the storage 106. More specifically, the fork point combination determination section 120 divides the sequential execution trace information into a plurality of segments to perform processing a to c with respect to each information segment. Subsequently, from a set of fork points present in the segment, which are included in the fork point set obtained by the fork point determination section 110, the fork point combination determination section 120 selects an optimal fork point combination. After that, the fork point combination determination section 120 integrates the optimal fork point combinations in the respective segments into one optimal combination.

a) Obtain a dynamic boost value, the minimum number of execution cycles and an exclusive fork set as dynamic fork information from the sequential execution trace information segment with respect to each fork point included in the fork point set obtained by the fork point determination section 110.

Assuming that a fork point appears "n" times when the sequential processing program is executed according to particular input data, the dynamic boost value is the sum of $C_1$, $C_2, \ldots,$ and $C_n$ (C: the number of execution cycles from the fork source to fork destination point of the fork point at each appearance).

The minimum number of execution cycles is the smallest number among $C_1, C_2, \ldots,$ and $C_n$.

The exclusive fork set of a fork point indicates a set of fork points which cannot be used concurrently with the fork point when the sequential processing program is executed according to particular input data.

b) Remove fork points satisfying a dynamic rounding condition 153 previously stored in a storage unit 153M of the storage 106 from the fork points included in the fork point set determined by the fork point determination section 110.

c) Create a combination of fork points, which are not in an exclusive relationship, with the maximum sum of dynamic boost values from the fork points in the fork point set after the dynamic rounding of processing b. Preferably, with the combination as an initial solution, a combination with better parallel execution performance is found based on an iterative improvement method.

The parallelized program output section 130 receives as input the intermediate data 141 and the intermediate data 142, and places a fork command at each fork point included in the optimal combination determined by the fork point combination determination section 120 to create the parallelized program 103 from the sequential processing program suitable for parallelization obtained by the fork point determination section 110. In post-processing, the parallelized program output section 130 writes the parallelized program 103 to a storage unit 103M of the storage 104. Preferably, the parallelized program output section 130 performs instruction scheduling under the condition that instructions be not exchanged across the fork source point or the fork destination point of the fork point in the optimal combination determined by the fork point combination determination section 120.

A description will now be given of an outline of the operation of the program parallelizing apparatus 100 in this embodiment.

Figure 2:
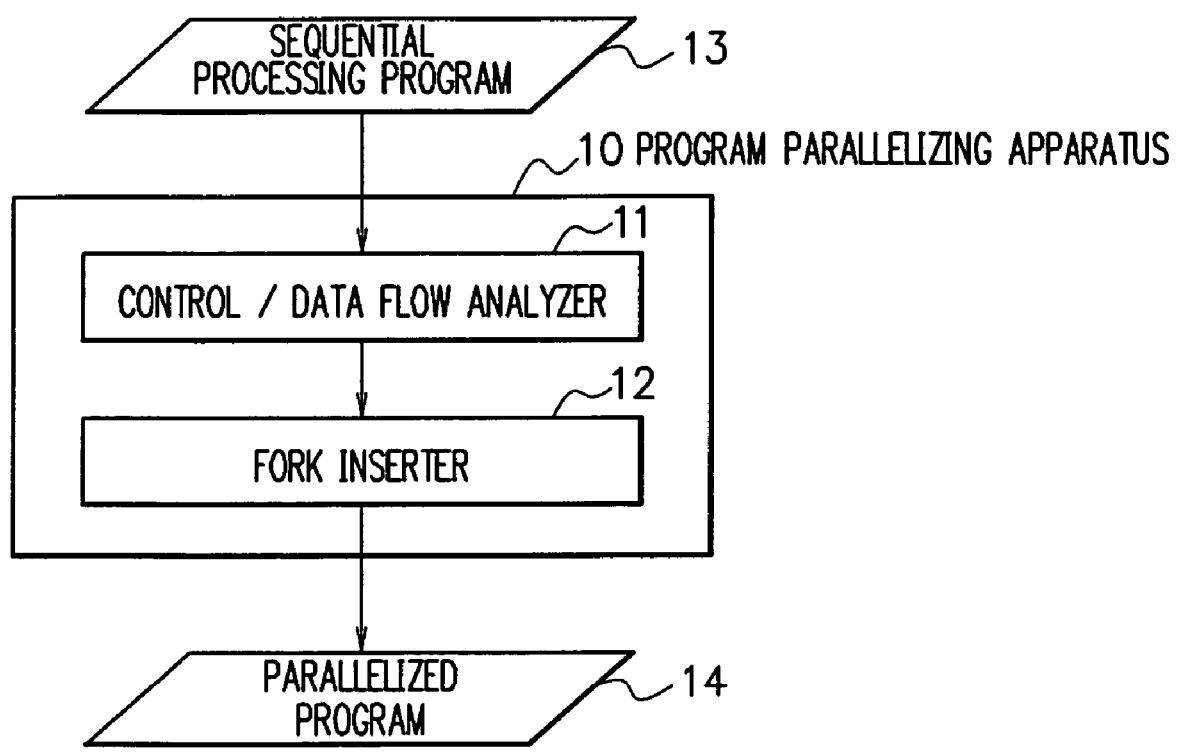
FIG. 2 is a block diagram showing an example of the construction of a conventional program parallelizing apparatus.

As can be seen in FIG. 3-2, when the program parallelizing apparatus 100 is activated, the fork point determination section 110 of the processing unit 107 analyzes the sequential processing program 101 and at least one sequential processing program obtained by converting an instruction sequence in part of the program 101 into another instruction sequence equivalent thereto. The fork point determination section 110 selects a sequential processing program most suitable for parallelization from the sequential processing programs (step S11). The fork point determination section 110 extracts all fork points from the selected sequential processing program (step S12), and removes those with a static boost value satisfying the static rounding condition 151 from the fork points (step S13).

Subsequently, the fork point combination determination section 120 of the processing unit 107 generates sequential execution trace information gathered while the sequential processing program suitable for parallelization determined by the fork point determination section 110 is being executed according to the input data 152, and divides the information into segments (step S14). The fork point combination determination section 120 obtains a dynamic boost value, the minimum number of execution cycles and an exclusive fork set as dynamic fork information from the sequential execution trace information segment with respect to each fork point included in the fork point set obtained by the fork point determination section 110 (step S15). The fork point combination determination section 120 compares the dynamic boost value and the minimum number of execution cycles with the dynamic rounding condition 153, and removes fork points satisfying the condition 153 (step S16). The fork point combination determination section 120 creates an initial combination of fork points with excellent parallel execution performance from the fork points after the dynamic rounding (step S17) and, using the initial combination as an initial solution, finds a combination with better execution performance based on an iterative improvement method (step S18). With respect to each sequential execution trace information segment, the fork point combination determination section 120 repeatedly performs the process from step S15 through S18. The fork point combination determination section 120 integrates the optimal combinations in the respective sequential execution trace information segments according to an appropriate criterion to generate one optimal fork point combination (step S19).

After performing post-processing if necessary (step S20), the parallelized program output section 130 inserts a fork command into the sequential processing program suitable for parallelization obtained by the fork point determination section 110 based on the optimal fork point combination determined by the fork point combination determination section 120 to create the parallelized program 103 (step S21).

As is described above, in accordance with the first embodiment of the present invention, it is possible to create a parallelized program with better parallel execution performance. This is because, based on an input sequential processing program, one or more sequential processing programs equivalent to the input program is produced through program conversion. From the input sequential processing program and those obtained by the program conversion, a program with the best index of parallel execution performance is selected to create a parallelized program. In the case where the sequential processing program equivalent to the input program is generated by rearranging instructions, the sequential processing performance of the generated program may be less than that of the input program. However, the adverse effects can be minimized by instruction scheduling performed in post-processing.

Moreover, it is possible to create a parallelized program with better parallel execution performance at a high speed for the following reasons.

First, by either or both static rounding and dynamic rounding, the fork points less contributing to parallel execution performance are removed at an early stage of processing. This reduces time for subsequent processing such as to collect dynamic fork information or to determine an optimal fork point combination.

Second, sequential execution trace information, obtained while a sequential processing program is being executed with particular input data, is divided into a plurality of segments. From a set of fork points which are included in a fork point set obtained by the fork point determination section and appear in the sequential execution trace information segment, an optimal fork point combination is selected. Thereafter, the optimal fork point combinations in the respective information segments are integrated into one optimal combination. In other words, the time required to determine the optimal fork point combination exponentially increases depending on the number of candidate fork points. Since the fork point set that appears in each information segment is a subset of the fork point set obtained by the fork point determination section, as compared to the case where an optimal fork point combination is obtained from the set of all fork points at a time, the time taken to determine the optimal fork point combination is remarkably reduced. Even considering the time to integrate the combinations afterwards, the overall processing time can be shortened.

Third, the fork point combination determination section creates a combination of fork points, which are not in an exclusive relationship, with the maximum sum of dynamic boost values. The combination approximates the optimal combination. Therefore, with the combination as an initial solution, the time taken to find a fork point combination with better parallel execution performance based on an iterative improvement method can be remarkably reduced.

In the following, a description will be given in detail of each component of the program parallelizing apparatus 100 of this embodiment.

First, the fork point determination section 110 will be described in detail.

Figure 4:
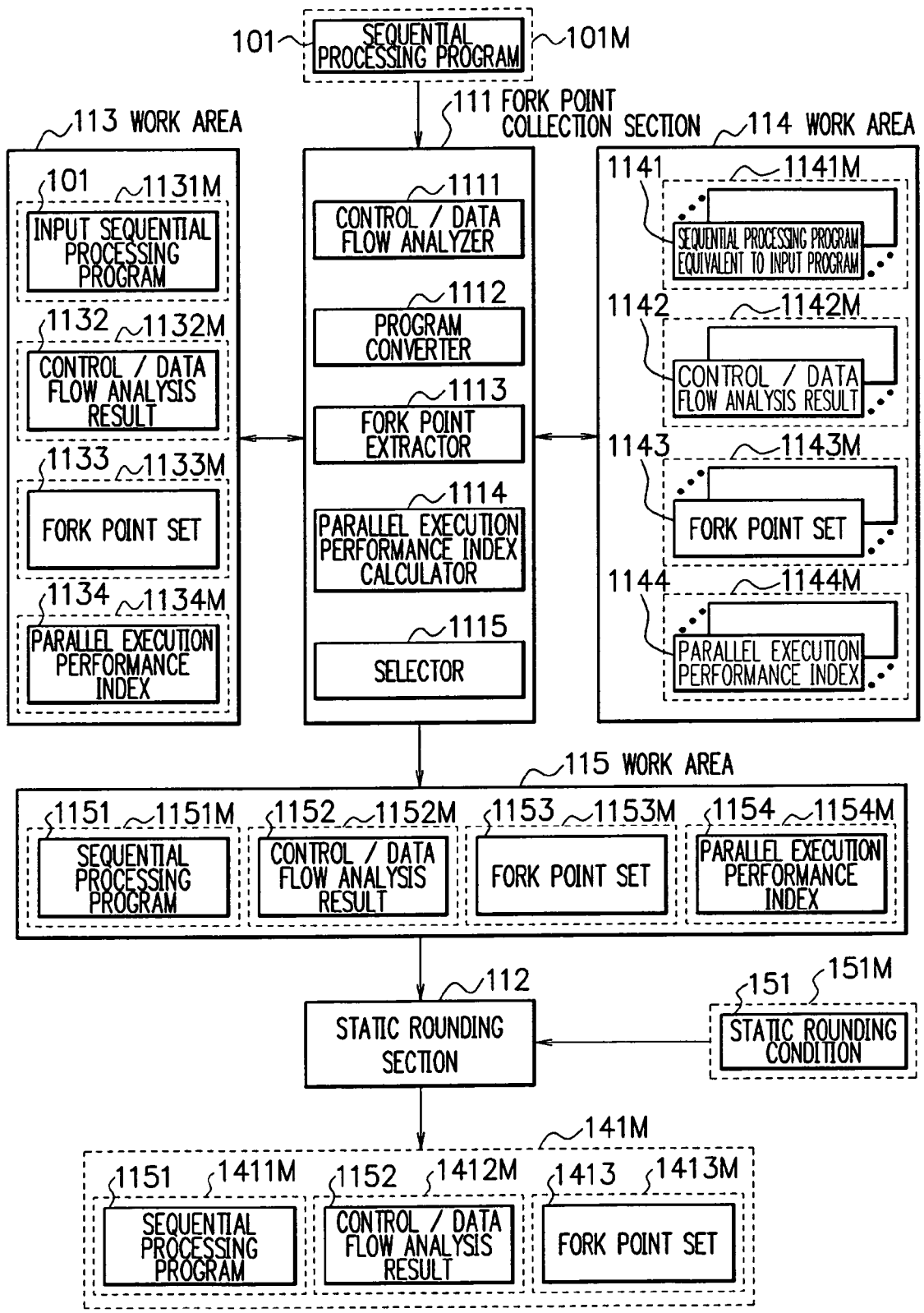
FIG. 4 is a block diagram showing a fork point determination section in the program parallelizing apparatus according to the first embodiment of the present invention.

Referring to FIG. 4, the fork point determination section 110 includes a fork point collection section 111, a static rounding section 112, and work areas 113 to 115 in, for example, the storage 105.

The fork point collection section 111 selects a sequential processing program most suitable to create a parallelized program with better parallel execution performance from the sequential processing program 101 and at least one sequential processing program obtained by converting an instruction sequence in part of the program 101 into another instruction sequence. The fork point collection section 111 collects a set of all fork points in the selected sequential processing program.

The fork point collection section 111 includes a control/data flow analyzer 1111, a program converter 1112, a fork point extractor 1113, a parallel execution performance index calculator 1114, and a selector 1115.

Figure 5:
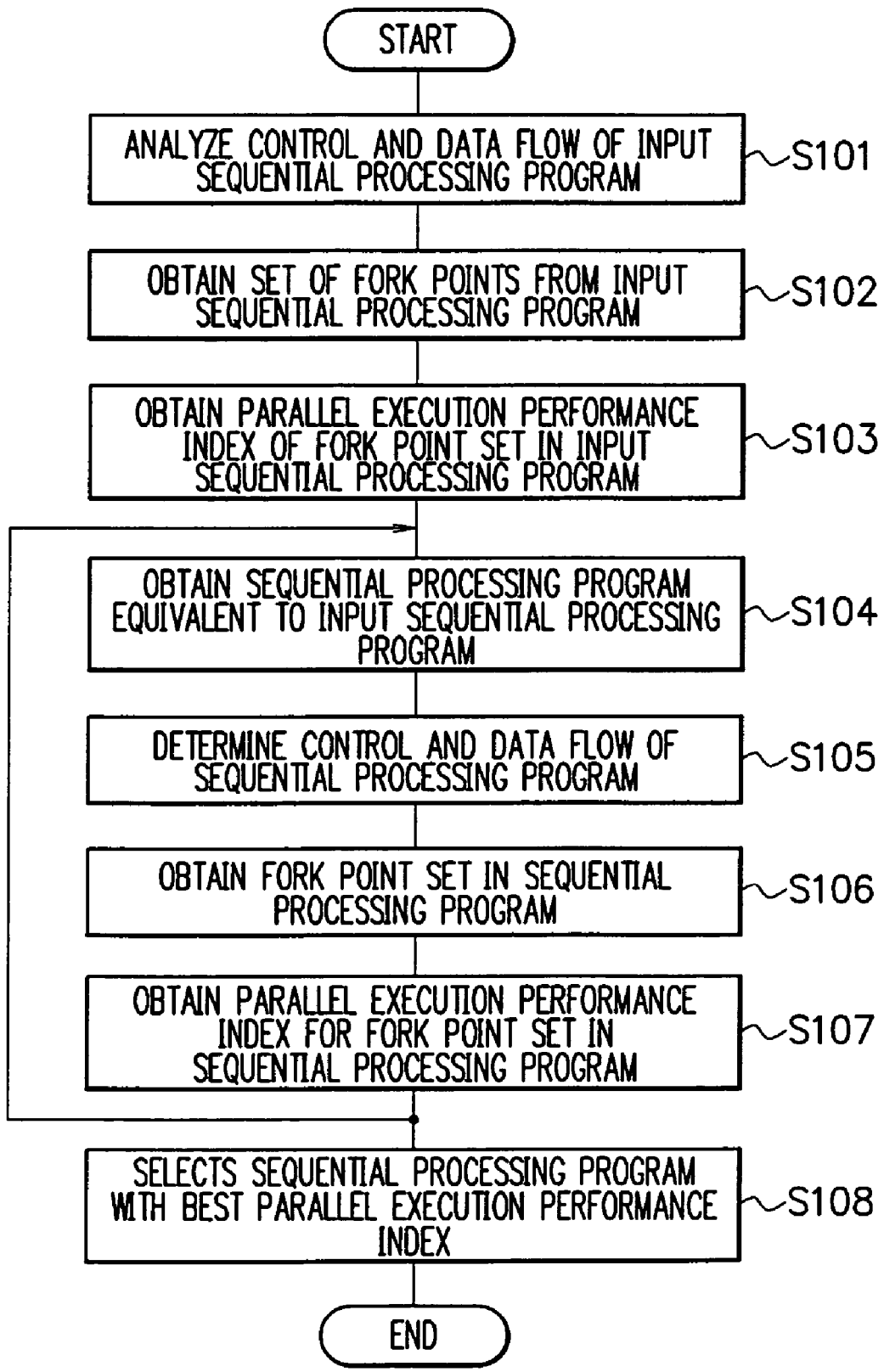
FIG. 5 is a flowchart showing an example of the operation of a fork point collection section in the program parallelizing apparatus according to the first embodiment of the present invention.

FIG. 5 is a flowchart showing an example of the operation of the fork point collection section 111. As can be seen in FIG.

5, the fork point collection section 111 stores the input sequential processing program 101 in a storage area 1131M of the work area 113, analyzes the program 101 through the control/data flow analyzer 1111 to obtain a control/data flow analysis result 1132 including a control flow graph and a data dependence graph, and stores the result 1132 in a storage area 1132M (step S101).

The control flow graph illustrates branches and merges in a program in a graph form. The graph is a directed graph in which the part (basic block) without any branch and merge is defined as a node, and nodes are linked by edges representing branches and merges. A detailed description of the control flow graph is provided on pages 268-270 of "Compiler Construction and Optimization" published by Asakura Shoten, 20 Mar. 2004. The data dependence graph illustrates data dependencies (relationship between definitions and uses) in a program in a graph form. Also on pages 336 and 365 of the above cited reference, there is a detailed description of the data dependence graph.

The fork point collection section 111 refers to the control/data flow analysis result 1132 by the fork point extractor 1113 to extract all fork points in the input sequential processing program 101, and stores a set of the fork points 1133 in a storage area 1133M (step S102). Each fork point includes a pair of a fork source point (fork source address) and a fork destination point (fork destination address) and is denoted herein by f. To explicitly indicate fork source and fork destination points, the fork point may be written as f(i, j), where i is the fork source point and j is the fork destination point.

Figure 6:
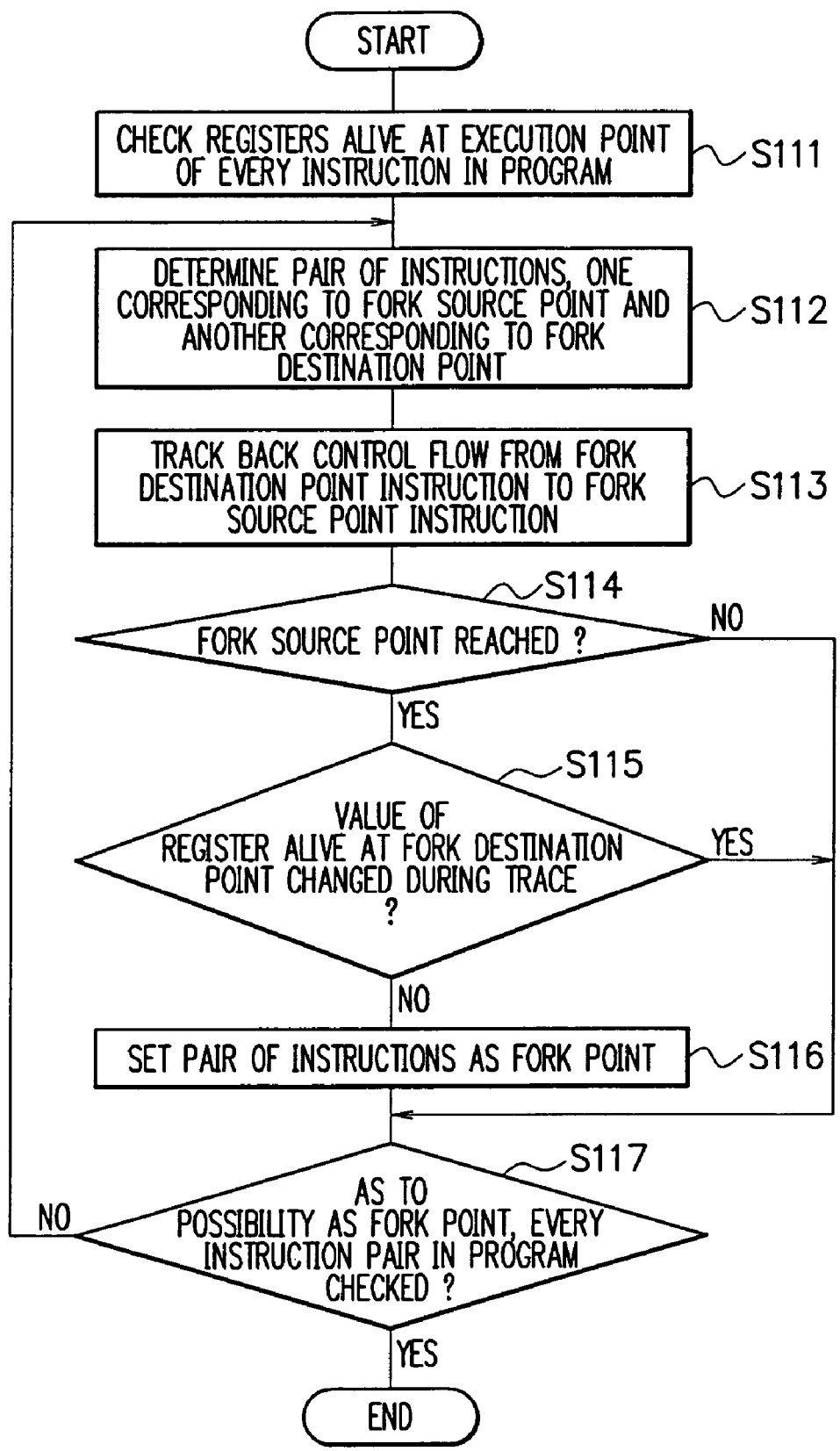
FIG. 6 is a flowchart showing an example of the operation of a fork point extractor in the program parallelizing apparatus according to the first embodiment of the present invention.

FIG. 6 is a flowchart showing an example of the operation of the fork point extractor 1113 to extract fork points satisfying fork point condition 1.

Referring to FIG. 6, for all instructions in the sequential processing program for the parallelization, the fork point extractor 1113 checks registers alive at the execution point of each instruction by referring to the control/data flow analysis result of the program to store the registers in, for example, a memory (step S111). The fork point extractor 1113 selects a pair of instructions, one corresponding to a fork source point and another corresponding to a fork destination point, from all pairs of instructions in the sequential processing program (step S112). The fork point extractor 1113 checks each instruction pair to determine whether or not control flow can be traced back from the fork destination point to the fork source point (steps S113 and S114). If the control flow cannot be traced back (step S114/No), the instruction pair is not a fork point, and the process proceeds to step S117. If the control flow can be traced back (step S114/Yes), the fork point extractor 1113 checks whether or not the value of a register alive at the fork destination point has been changed during the trace (step S115). If the register value has changed (step S115/Yes), the instruction pair is not a fork point, and the process proceeds to step S117. If the register value has not changed (step S115/No), the fork point extractor 1113 adds the instruction pair as a fork point to a fork point set (step S116), and the process proceeds to step S117. The fork point extractor 1113 determines whether or not every instruction pair in the sequential processing program has been checked as to its possibility as a fork point (step S117). If there remains an instruction pair to be checked, the process returns to step S112 and the above process is repeated. If all instruction pairs have been checked, the fork point extractor 1113 terminates the fork point extraction process.

After that, the fork point collection section 111 calculates, through the parallel execution performance index calculator 1114, a parallel execution performance index 1134 for the fork point set 1133 to store the calculation result in a storage area 1134M (step S103). In this example, the sum of static boost values of fork points is employed as the parallel execution performance index. For convenience of the static rounding section 112, the static boost value of each fork point is also stored together with the sum thereof.

The static boost value of a fork point is the total weight of all instructions from the fork source to fork destination point of the fork point, and can be mechanically calculated from the sequential processing program and the control/data flow analysis result. For example, based on the control/data flow analysis result, a weighted data flow graph (a data flow graph with weighted edges) of the program is generated. With respect to each fork point, the weights on the graph, within the region of the fork point from the fork source to fork destination point, are accumulated to obtain the static boost value of the fork point. The static boost value of a fork point f is expressed herein as static_boost (f). As the weight of an instruction, for example, the number of cycles required to execute the instruction is used. In the following, a description will be given of a specific example of the static boost value of a fork point referring to a program shown in FIG. 7 (a).

In the program of FIG. 7 (a), lines 1 and 3 include mov instructions to assign values "10" and "1000" to registers r0 and r2, respectively. Line 2 indicates an add instruction to add the value of register r0 to a value of "100" to place the result in register r1. Line 4 includes an ldr instruction to load register r3 with a value determined by the value of register r2 and a value of "10" from a memory address. Assuming that a fork point in the program is f(1, 3)=$f_1$, where line 1 corresponds to a fork source point and line 3 corresponds to a fork destination point, if the weight of the mov and add instructions is "1", the static boost value of the fork point: static_boost($f_1$) is "2".

The reason why the static boost value and the sum thereof are available as an index of parallel execution performance will be described by referring to a schematic diagram of FIG. 7 (b). It is assumed that a single thread, with a fork point in which instruction a corresponds to a fork source point and instruction b corresponds to a fork destination point, shown on the left side of FIG. 7 (b) is divided into two threads for parallel execution as shown on the right side of FIG. 7 (b). In this case, the execution time can be reduced by the amount indicated by Δ. The amount of time Δ corresponds to a static boost value obtained by adding up weights of instructions from the fork source to fork destination point of the fork point.

The fork point collection section 111 then creates, through the program converter 1112, a sequential processing program 1141 by converting a sequence of instructions in part of the input sequential processing program into another sequence of instructions equivalent to the original one, and stores the program 1141 in a storage area 1141M of the work area 114 (step S104). As in the case of the input sequential processing program 101, the control/data flow analyzer 1111 obtains a control/data flow analysis result 1142 for the sequential processing program 1141 created by the program conversion, the fork point extractor 1113 obtains a fork point set 1143 in the program 1141, and the parallel execution performance index calculator 1114 obtains a parallel execution performance index 1144 for the fork point set. The results are stored in storage areas 1142M, 1143M, and 1144M, respectively (steps S105 to S107).

A plurality of sequential processing programs which are equivalent to the input sequential processing program 101 and different from each other may be created. In such a case, a control/data flow analysis result, a fork point set, and a parallel execution performance index may be obtained with respect to each program. In this case, the process from step S104 through S107 is repeatedly performed.

After that, from the sequential processing program 101 and one or more sequential processing programs 1141, the fork point collection section 111 selects, through the selector 1115, a sequential processing program with the best parallel execution performance index or the maximum sum of static boost values. The fork point collection section 111 stores the program as a sequential processing program 1151 in a storage area 1151M of the work area 115 (step S108). At the same time, the fork point collection section 111 stores for the sequential processing program 1151 a control/data flow analysis result 1152, a fork point set 1153, and a parallel execution performance index 1154 in storage areas 1152M, 1153M, and 1154M of the work area 115, respectively.

From the fork points in the fork point set 1153, the static rounding section 112 removes fork points with a static boost value that satisfies the static rounding condition 151 as those less contributing to parallel execution performance. The remaining fork points are written as a fork point set 1413 to a storage area 1413M of the storage unit 141M in the storage 105. The sequential processing program 1151 and the control/ data flow analysis result 1152 thereof are also written to storage areas 1411M and 1412M of the storage unit 141M, respectively.

The static boost value of each fork point in the fork point set 1153 is recorded in the parallel execution performance index 1154. The static rounding section 112 compares the static boost value with the static rounding condition 151 to determine whether to use or remove the fork point.

Examples of the static rounding condition 151

Static rounding condition 1: static boost value<Ms

Static rounding condition 2: static boost value>Ns

According to static rounding condition 1, any fork point with a static boost value less than lower limit threshold value Ms is removed for the following reasons. When the static boost value is too small, the effect of parallel execution to which the fork point contributes is less as compared to the overhead associated with parallelization. Thus, the fork point does not contribute to parallel execution performance.

The setting of lower limit threshold value Ms depends on the architecture of a multithreading parallel processor as a target, and is determined by, for example, preliminary experiments.

According to static rounding condition 2, any fork point with a static boost value more than upper limit threshold value Ns is removed for the following reasons. When the static boost value is too large, a true dependency (RAW: Read After Write) violation is likely to occur. Resultantly, the fork point does not contribute to parallel execution performance.

Figure 8:
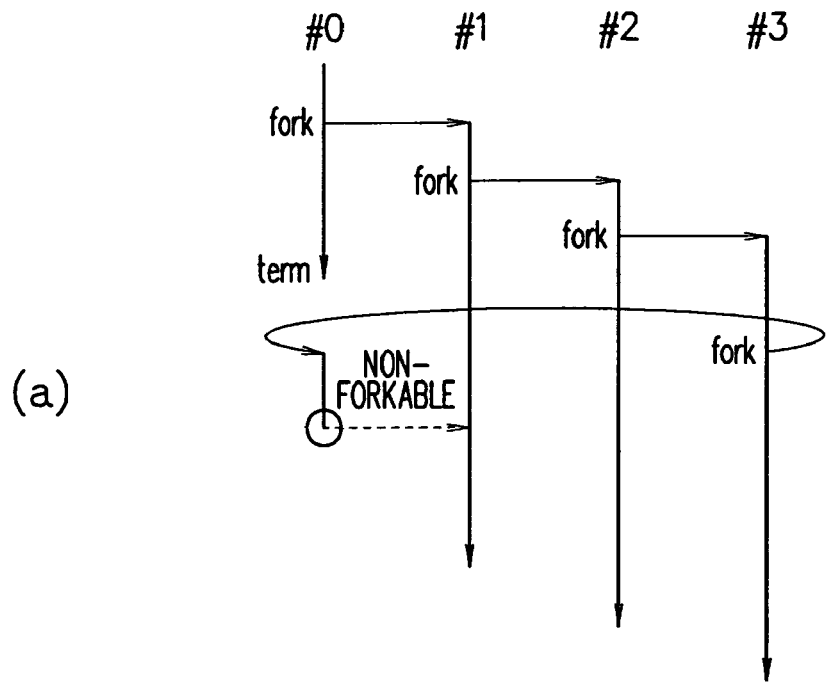
Figure 2:
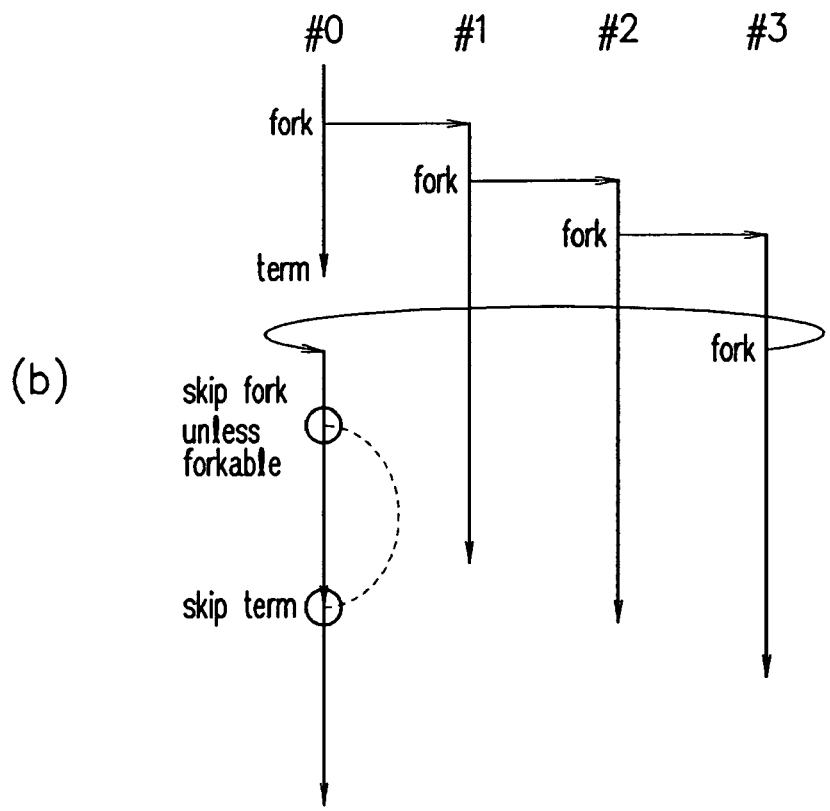

FIG. 8-1 (a) shows a simplified image of true dependency. True dependency indicates that data written in a particular cycle is read later therefrom. In FIG. 8-1 (a), data that is stored in address 100 of the memory at the point indicated by a white circle is read or loaded later therefrom at a point indicated by a black circle. Although a memory is cited as an example, data may be stored in a register or the like. In sequential execution, no dependency problem occurs. However, in parallel execution, a problem may arise depending on circumstances. It is now assumed that a fork point including a fork source point and a fork destination point as indicated in the figure is set in a single thread of FIG. 8-1 (a) to split the thread into plural threads for parallel execution as shown in FIG. 8-1 (b). The data stored in the memory at the point of a white circle is supposed to be read therefrom at the point of a black circle. In FIG. 8-1 (b), however, a load instruction indicated by a black circle is executed ahead of a store instruction indicated by a white circle. That is, a true dependency is violated. Such true dependency violation is more likely to occur as the thread length from the fork source to fork destination point increases, namely, as the static boost value becomes larger. The occurrence of a true dependency violation lowers parallel execution performance in a multithreading parallel processor in which a child thread is re-executed.

A fork point with a static boost value exceeding upper limit threshold value Ns is removed for another reason as follows. In a ring-type fork model multithreading parallel processor, in which a child thread can be created only on one of the adjacent processors, when the static boost value is too large, the respective processors are busy for a long time. Consequently, a chain of fork commands are interrupted, and the process efficiency decreases. A further description will be given by referring to FIG. 8-2 (a). In FIG. 8-2 (a), a thread is forked or moved from processor #0 to processor #1 adjacent thereto, from processor #1 to processor #2 adjacent thereto, and from processor #2 to processor #3 adjacent thereto. At the fork point of processor #3, processor #0 is free, and a child thread is successfully forked from processor #3 to processor #0. However, at the fork point of a thread newly created on processor #0, since adjacent processor #1 is busy, thread forking is disabled. In such a case, the process efficiency is improved with a multithreading parallel processor in which, as shown in FIG. 8-2 (b), processor #0 skips (nullifies) the fork to execute the child thread, which is supposed to be executed on adjacent processor #1, as compared to that of a multithreading parallel processor in which processor #0 is in the wait state until processor #1 becomes free. However, parallel execution performance is reduced.

The setting of upper limit threshold value Ns depends on the architecture of a multithreading parallel processor as a target, and is determined by, for example, preliminary experiments.

In the following, the program converter 1112 will be described in detail.

The program converter 1112 performs either or both instruction relocation and register allocation change to produce at least one sequential processing program 1141 equivalent to the input sequential processing program 101. Next, a description will be given of instruction relocation and register allocation change individually.

Instruction Relocation

In general, a sequential compiler to generate a target program for a processor capable of instruction-level parallel execution, such as a superscalar machine, performs the optimization of instruction allocation to avoid a pipeline stall, to improve instruction level concurrency or the like. The optimization is performed in such a manner that as much interval as possible is provided between instructions with a data dependency. In other words, instructions are arranged so that a lifetime or alive time in which variables are being used is increased. The optimization is generally called instruction scheduling and is possibly a factor to hinder the extraction of thread concurrency for the following reason. If the lifetime of variables is increased by instruction scheduling, the number of extractable candidate fork points is decreased, and an index of parallel execution performance as the sum of the static boost values may also be reduced. To overcome the problem, the sequential processing program 1141 is created in which instructions are rearranged, in contrast to the case of instruction scheduling, such that as little interval as possible is allowed between instructions with a data dependency to resultantly shorten the variable lifetime. If the parallel execution performance index of the sequential processing program 1141 is improved as compared to the original sequential processing program 101, the program 1141 is adopted to thereby obtain a parallelized program with better parallel execution performance.

In instruction relocation, if there exists an instruction to write data to a register, an instruction to read data from the register is moved to a position near the write instruction. However, the data dependency is to be maintained. If register renaming (including instruction addition and deletion) is performed, a true dependency (RAW) between the instructions needs to be satisfied. If register renaming is not performed, a true dependency (RAW), an anti dependency (WAR: Write After Read), and an output dependency (WAW: Write After Write) between the instructions are required to be satisfied. The relocation of instructions may begin with, for example, an instruction which appears at the upper end of a block.

Figure 9:
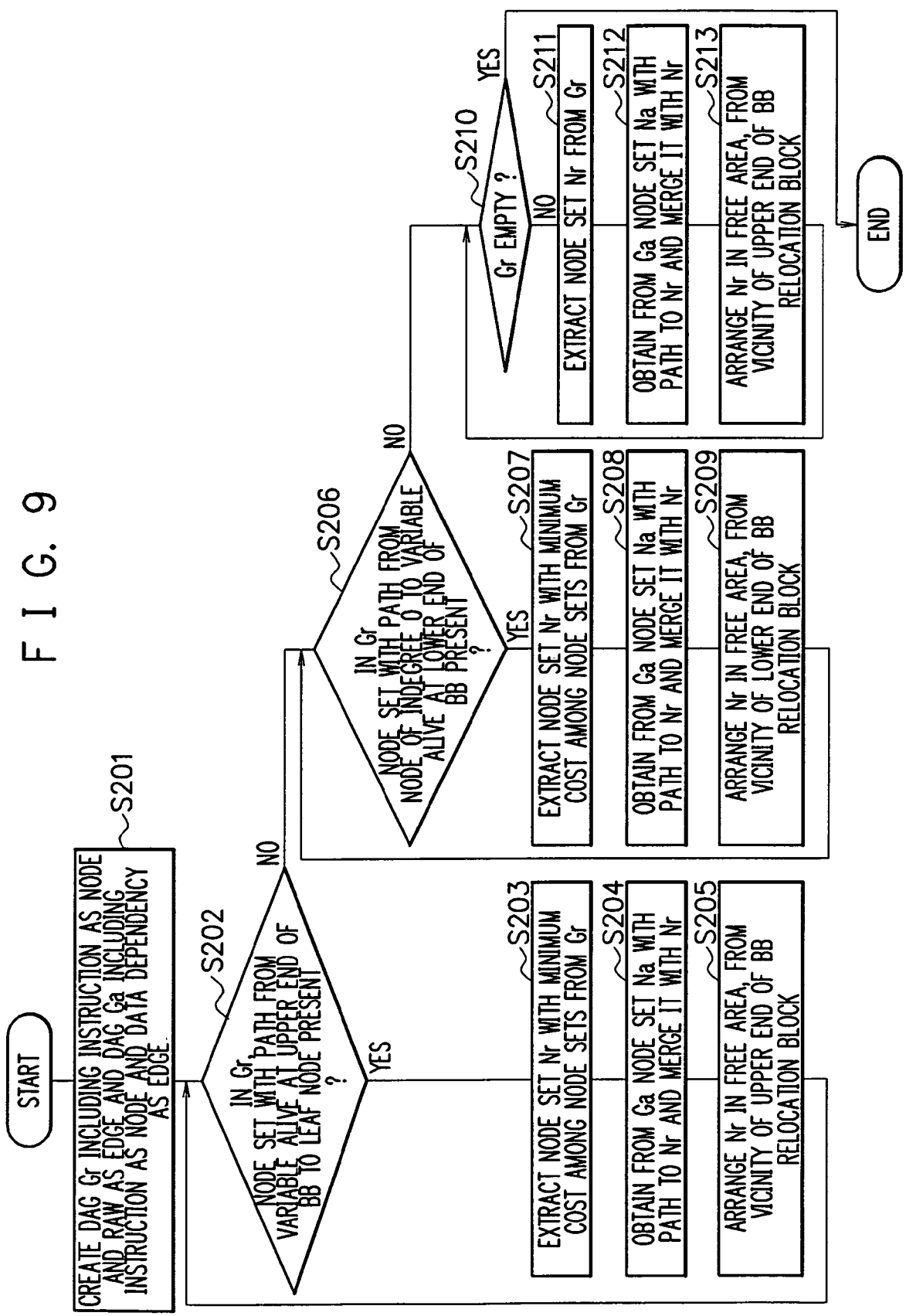
FIG. 9 is a flowchart showing an example of the instruction relocation operation of a program converter in the program parallelizing apparatus according to the first embodiment of the present invention.

FIG. 9 is a flowchart showing an example of the operation for rearranging instructions within a basic block without register renaming. FIG. 9 shows processing for one basic block, which is repeatedly performed for each basic block extracted from a sequential processing program through analysis of control flow.

As can be seen in FIG. 9, the program converter 1112 produces in a memory (not shown) a DAG (Directed Acyclic Graph) graph Gr in which each instruction in a basic block BB represents a node and an RAW relationship represents an edge and a DAG graph Ga in which each instruction in the basic block BB represents a node and not only RAW but also all data dependencies (RAW, WAR, and WAW) represent edges (step S201).

From sets of nodes with a data dependency, the program converter 1112 sequentially extracts node sets each having a path from a variable alive at the upper end of the basic block, and arranges the node sets in a free area, from the vicinity of the upper end of a relocation block reserved for rearrangement in the basic block (steps S202 to S205). More specifically, the program converter 1112 checks whether or not a set of nodes having a path from a variable alive at the upper end of the basic block BB to a leaf node is present in the graph Gr (step S202). If such node sets are present (step S202/Yes), node set Nr with the minimum cost among the node sets is selected from the graph Gr (step S203). From the graph Ga, node set Na having a path to node set Nr is extracted to be merged with Nr (step S204). Node set Nr after the merging is arranged in the free area, from the vicinity of the upper end of the relocation block (step S205). The cost herein is, for example, the number of instruction execution cycles.

From remaining sets of nodes with a data dependency, the program converter 1112 sequentially extracts node sets each having a path from a node with an Indegree of 0 (zero) (an initial Write node such as a node to set a constant to a register) to a variable alive at the lower end of the basic block. The program converter 1112 sequentially arranges the node sets in the free area, from the vicinity of the lower end of the relocation block (steps S206 to S209). More specifically, the program converter 1112 checks whether or not a set of nodes having a path from a node with an Indegree of 0 to a variable alive at the lower end of the basic block BB nodes is present in the graph Gr (step S206). If such node sets are present (step S206/Yes), node set Nr with the minimum cost among the node sets is selected from the graph Gr (step S207). From the graph Ga, node set Na having a path to node set Nr is extracted to be merged with Nr (step S208). Merged node set Nr is arranged in the free area, from the vicinity of the lower end of the relocation block (step S209).

After that, the program converter 1112 sequentially extracts remaining node sets with a data dependency to arrange the node sets in the free area, from the vicinity of the upper end of the relocation block (steps S210 to 213). More specifically, the program converter 1112 checks whether or not a set of nodes remains in the graph Gr (step S210). If a node set still remains (step S210/No), arbitrary node set Nr is selected from the graph Gr (step S211). From the graph Ga, node set Na having a path to node set Nr is extracted to be merged with Nr (step S212). Node set Nr after the merging is arranged in the free area, from the vicinity of the upper end of the relocation block (step 213).

In the following, a description will be given of a specific example of the operation of the program converter 1112 for rearranging instructions.

Figures 1, 2, 10:
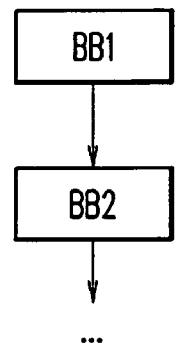
Figures 3, 10:
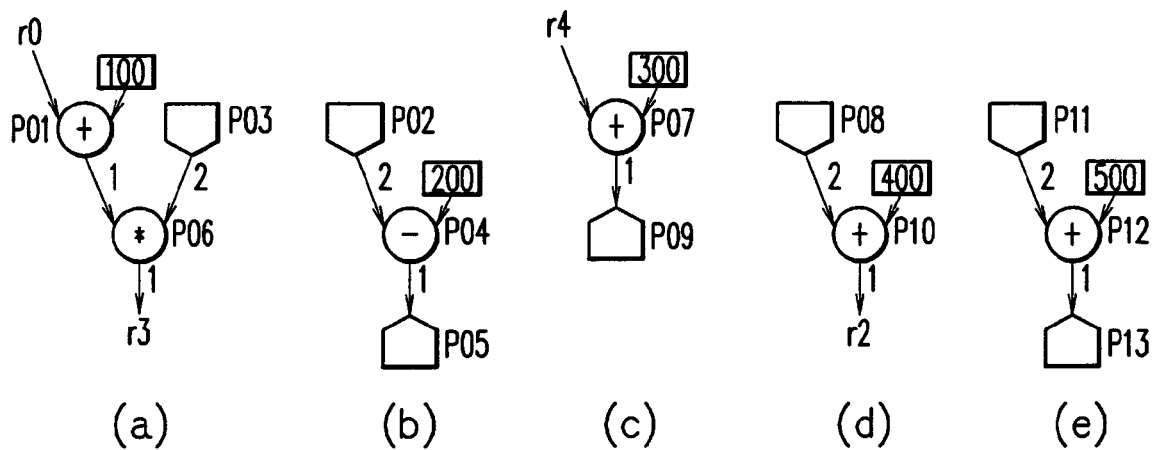
Figures 4, 10:
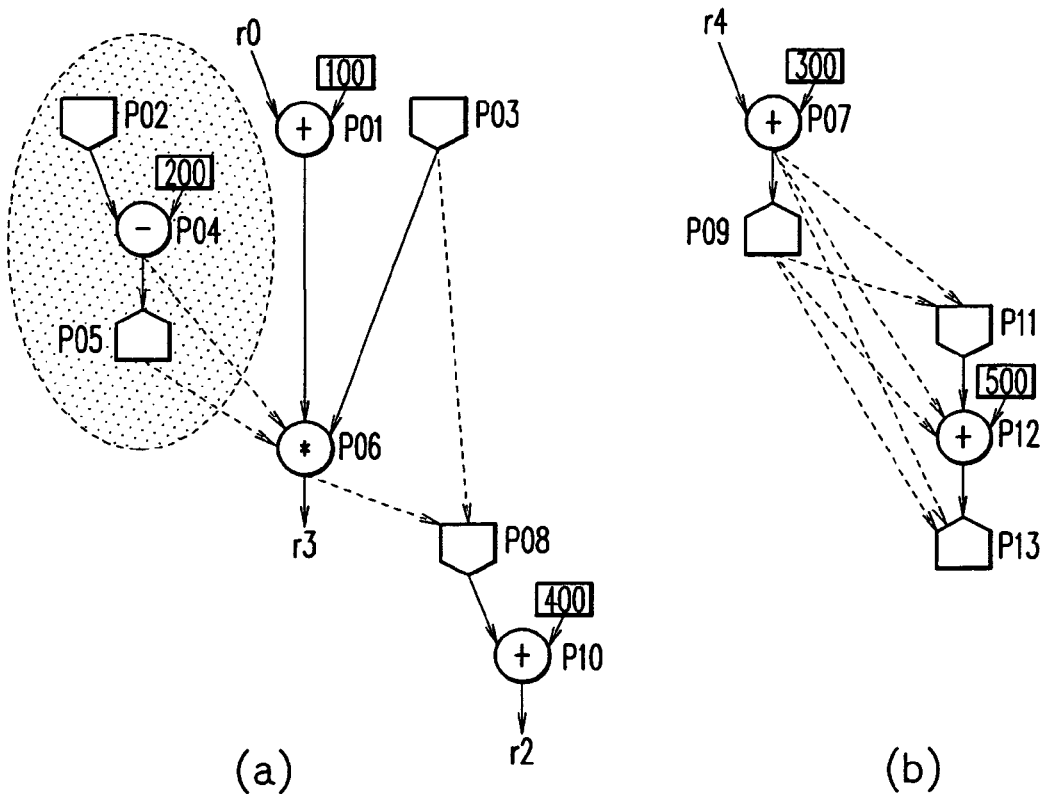

FIG. 10-1 shows an example of a program before instruction relocation, and FIG. 10-2 shows the control flow of the program. In the program, registers r0 and r4 (alive at the upper end of basic block BB2) are transferred from basic block BB1 to basic block BB2. Registers r2 and r3 (alive at the lower end of basic block BB2) are passed from basic block BB2 to a subsequent block. FIG. 10-3 shows DAGs, paying attention only to RAW. FIG. 10-4 shows DAGs, paying attention to all data dependencies (RAW, WAR, and WAW). In the drawings, a solid arrow indicates RAW, while a broken-line arrow indicates WAR or WAW.

It is assumed that instructions are rearranged in basic block BB2. FIGS. 10-3(*a*) and (*c*) each show a set of nodes having a path to a variable alive at the upper end of basic block BB2. Since the node set of FIG. 10-3 (*c*) is less in cost than that of FIG. 10-3 (*a*), first, the program converter 1112 arranges the instructions of the node set of FIG. 10-3 (*c*) in the basic block, from the upper end thereof. Having arranged the node set of FIG. 10-3 (*c*), the program converter 1112 arranges the instructions of the node set of FIG. 10-3 (*a*). However, referring to FIG. 10-4, there exists a node set linked with the node set of FIG. 10-3 (*a*): a node set enclosed with an ellipse in FIG. 10-4 (*a*) (the node set of FIG. 10-3 (*b*) corresponds to the node set). Consequently, the program converter 1112 also arranges the instructions of the node set linked with the node set of FIG. 10-3 (*a*). FIG. 10-5 shows a sequence of instructions after the processing up to this point. Incidentally, in FIG. 10-5 is shown only a sequence of instructions in basic block BB2.

FIGS. 10-3(*a*) and (*d*) each show a set of nodes having a path to a variable alive at the lower end of basic block BB2. Since the program converter 1112 has already arranged the instructions of the node set of FIG. 10-3 (*a*), the converter 1112 arranges the instructions of the node set of FIG. 10-3 (*d*). Referring to FIG. 10-4 (*a*), there exist other node sets linked with the node set of FIG. 10-3 (*d*). However, the instructions of the node sets have already been arranged, and no particular operation is required.

FIG. 10-3 (*e*) shows a node set (remaining node set) independent of variables alive at the upper and lower ends of the basic block BB. The program converter 1112 arranges the instructions of the node set of FIG. 10-3 (*e*) in the basic block, from as near to the upper end as possible.

FIG. 10-6 shows the result of the instruction relocation described above.

FIG. 10-7 shows register lifetimes and writing operation in a sequence of instructions before instruction relocation, while FIG. 10-8 shows those after instruction relocation. In FIGS. 10-7 and 10-8, a vertical line drawn downwards below each register indicates the lifetime of the register. Besides, a black circle on the vertical line indicates the occurrence of writing to the register, and "X" indicates that the lifetime of the register terminates with an instruction at the point.

If fork point condition 1 is applied which is the stricter one of fork point conditions 1 and 2, then there are obtained two fork points f(P05, P06) and f(P09, P10) before instruction relocation. On the other hand, there are four fork points f(P01, P03), f(P02, P03), f(P07, P08), and f(P11, P12) after instruction relocation.

Register Allocation Change

Generally, if a variable is stored in a register, the variable can be accessed faster than that stored in a memory. In addition, load and store instructions are not required. Therefore, a sequential compiler to produce a sequential processing program basically performs register allocation. However, since the number of registers is limited, there may not remain any register to which a new variable is to be allocated. In such a case, sometimes one of variables which has already been allocated to a register is saved in a memory to secure the register, and later, a register is assigned to the variable saved in the memory. It is not guaranteed that the same register originally used can be assigned again to the variable. In the sequential processing program 101, if a register other than the original one is assigned to the variable, the register is not consistent between when the variable is saved and when it is restored. Thus, it is not possible to extract a fork point in which the point when the variable is saved is a fork source point and the point when it is restored is a fork destination point. Accordingly, the program converter 1112 performs the same register allocation when the variable is saved and when it is restored. That is, the program converter 1112 creates the sequential processing program 1141 in which register allocation is changed so that a variable is to be allocated to the same register if possible. If the sequential processing program 1141 is improved in parallel execution performance index as compared to the original sequential processing program 101, the program 1141 in which register allocation has been changed is adopted to thereby obtain a parallelized program with better parallel execution performance.

A description will now be given of an example of the operation for changing register allocation in conjunction with a specific example of a sequence of instructions. For simplicity of explanation, it is assumed that the processor can use at most two registers r0 and r1.

FIG. 11-1 shows an example of a program before register allocation change, a description in a high-level language such as C language on the left side and a description obtained by translating the high level language into a lower-level language (pseudo assembler language) on the right side, which corresponds to the input sequential processing program 101. Unless otherwise noted, the program on the left side will be referred to as a source program and that on the right side will be referred to as a target program.

FIG. 11-2 shows periods of time from when variables (a to d) used in the source program are assigned to registers in the target program to when the variables become unnecessary. A code such as P01 above a vertical line corresponds to an identifier on the side of an instruction in the target program. A black circle on a horizontal line representing a lifetime is included in the lifetime at the point of the corresponding instruction. A white circle is not included in the lifetime at the point of the instruction. Taking lifetime 1 (refer to the number on the horizontal line) of variable a as an example, variable a is assigned to a register up to the instruction (st r0, 40) of P03, but is no longer required as a variable from the instruction (ld r0, 44) of P04.

FIG. 11-3 shows a register interference graph based on FIG. 11-2. In a register interference graph, each node represents a lifetime, and an edge connects two nodes if the lifetimes overlap. The lifetime indicates the period during which a value or a variable is assigned to a register. The number assigned to a node corresponds to the number on the horizontal line shown in FIG. 11-2. The types of registers, to which nodes are assigned, are distinguished by colors, white and gray. The white color indicates register r0 in a target program, while the gray color indicates register r1 in a target program. For example, variable a is allocated to register r0 (white) during lifetime 1, and variable a is allocated to register r1 (gray) during lifetime 4.

It is now assumed that register allocation is changed in a sequence of instructions from P01 to P09 in the target program.

Referring to FIG. 11-2, lifetimes 1 and 4 are associated with the same variable (variable a). Therefore, in FIG. 11-3, node 1 is merged with node 4. The graph of FIG. 11-4 illustrates the result of the merging. At this point, nodes have not been colored (i.e., a register has not been allocated to each node). For the graph, a k-coloring problem is to be solved. The k-coloring problem consists in coloring all nodes on the graph using k colors such that no adjacent nodes have the same color. In this example, since the processor can use two registers, k is two. If the solution of the k-coloring problem indicates "yes" (i.e., nodes can be colored with two colors), register allocation is changed. FIG. 11-5 shows an example of a graph after coloring.

FIG. 11-6 shows a target program obtained by changing register allocation according to FIG. 11-5. The difference resides in the registers to which variables a and d are assigned after P07. If fork point condition 2 is applied, the target program of FIG. 11-1 before register allocation change includes two fork points, f(P03, P04) and f(P06, P07). On the other hand, the target program of FIG. 11-6 after register allocation change additionally includes f(P02, P07), f(P02, P08), f(P03, P07), f(P03,P08), f(P04, P07), and f(P04, P08), namely, a total of eight fork points.

A description will now be given in detail of the fork point combination determination section 120.

Referring to FIG. 12, the fork point combination determination section 120 includes a sequential execution trace information acquisition section 121, a division section 122, a repeat section 123, an integration section 124, and a work area 125 in, for example, the storage 105.

The sequential execution trace information acquisition section 121 executes by a processor or a simulator the sequential processing program 1151 (shown in FIG. 4) included in the intermediate data 141 in the storage unit 141M using the input data 152 previously stored in the storage unit 152M. Thereby, the sequential execution trace information acquisition section 121 creates sequential execution trace information 1251, and stores the information 1251 in a storage area 1251M of the work area 125. The sequential execution trace information 1251 includes, with respect to each machine cycle, identification information such as an address to designate an instruction statement in the sequential processing program 1151 executed in the machine cycle. The sequential execution trace information 1251 also includes the total number of cycles SN at sequential execution.

The division section 122 divides the sequential execution trace information 1251 stored in the storage area 1251M by the predetermined number of sequential execution cycles N to obtain sequential execution trace information segments 1252, and stores the information segments 1252 in a storage area 1252M. When the total number of execution cycles SN for the sequential execution trace information 1251 is not an integral multiple of N, the last sequential execution trace information segment is small in size. If the size is substantially less than N, the last sequential execution trace information segment may be combined with the one immediately before the last information segment. Although depending on the number of sequential execution cycles N, only part of fork points included in the fork point set 1413 (shown in FIG. 4) determined by the fork point determination section 110 appears in each sequential execution trace information segment 1252.

The repeat section 123 includes a dynamic fork information acquisition section 1231, a dynamic rounding section 1232, an initial combination determination section 1233, and a combination improvement section 1234. With respect to each sequential execution trace information segment 1252 obtained by the division section 122, the repeat section 123 acquires dynamic fork information, performs dynamic rounding, creates an initial combination of fork points, and improves the initial combination.

A description will next be given of the dynamic fork information acquisition section 1231, the dynamic rounding section 1232, the initial combination determination section 1233, and the combination improvement section 1234.

With respect to each sequential execution trace information segment 1252, the dynamic fork information acquisition section 1231 obtains a dynamic boost value, the minimum number of execution cycles, and an exclusive fork set for each fork point included in the fork point set 1413 obtained by the fork point determination section 110 to store them as dynamic fork information 1253 in a storage area 1253M. FIG. 13 shows an example of the operation of the dynamic fork information acquisition section 1231.

As can be seen in FIG. 13, for each fork point included in the fork point set 1413, the dynamic fork information acquisition section 1231 secures in the storage area 1253M a structure to store a dynamic boost value, the minimum number of execution cycles, and an exclusive fork set of the fork point, and sets these items as defaults (step S301). For example, the dynamic fork information acquisition section 1231 sets as initial settings the dynamic boost value to the minimum value, the minimum number of execution cycles to the maximum value, and the exclusive fork set to empty. As the structure to store the exclusive set, there can be employed a string of bits each having a one-to-one correspondence with a fork point in which a bit is set to "1" if there exists an exclusive relationship. Such bit string reduces the amount of memory to be used.

Next, the dynamic fork information acquisition section 1231 selects one fork point (referred to as first fork point) from the fork point set 1413 (step S302), and sequentially searches the sequential execution trace information segments 1252, from the top, for the location of the fork source point of the first fork point (step S303). Having detected one fork source point (step S304/Yes), the dynamic fork information acquisition section 1231 retrieves a fork destination point to be paired with the fork source point from the sequential execution trace information segment 1252 (step S305). The dynamic fork information acquisition section 1231 counts the number of execution cycles between the fork source and fork destination points in the sequential execution trace information segment 1252 (step S306) to compare it with the minimum number of execution cycles stored in the structure for the first fork point (step S307). If the number of execution cycles is not more than the minimum number of execution cycles stored in the structure (step S307/No), the dynamic fork information acquisition section 1231 replaces the minimum number with the obtained number (step S308). Next, the dynamic fork information acquisition section 1231 adds the number of execution cycles to the dynamic boost value of the first fork point stored in the structure (step S309). Thereafter, the dynamic fork information acquisition section 1231 searches for another fork point in the fork point set 1413, at least one of whose fork source and fork destination points exists between the fork source and fork destination points of the first fork point. The dynamic fork information acquisition section 1231 adds detected fork points to the exclusive fork set of the first fork point (step S310). Incidentally, there may be found no fork destination point to be paired with the fork source point obtained in step S303 in the sequential execution trace information segment 1252, resulting in the failure of the retrieval in step S305. In this case, the dynamic fork information acquisition section 1231 may search another sequential execution trace information segment 1252, or skip the process from step S306 through S310.

When the dynamic fork information acquisition section 1231 has finished the above-described process as to a pair of the fork source and fork destination points of the first fork point in the sequential execution trace information segment 1252, the process returns to step S303. The dynamic fork information acquisition section 1231 searches the sequential execution trace information segments 1252 for another fork source point of the first fork point. When having detected such a fork source point, the dynamic fork information acquisition section 1231 repeats the process from step S305 through S310.

Having completed the process for all fork source points of the first fork point in sequential execution trace information segments 1252 (step S304/No), the dynamic fork information acquisition section 1231 selects another fork point in the fork point set 1413 (step S311), and repeats the same process as above described for the next fork point. Having completed the operation for all fork points in the fork point set 1413 (step S312/No), the dynamic fork information acquisition section 1231 finishes the operation for obtaining a dynamic boost value, the minimum number of execution cycles, and an exclusive fork set for each fork point from the sequential execution trace information segments 1252. As to a fork point not found in the sequential execution trace information segments 1252, the dynamic boost value, the minimum number of execution cycles, and the exclusive fork set remain defaults.

In the following, the dynamic rounding section 1232 will be described.

Figure 14:
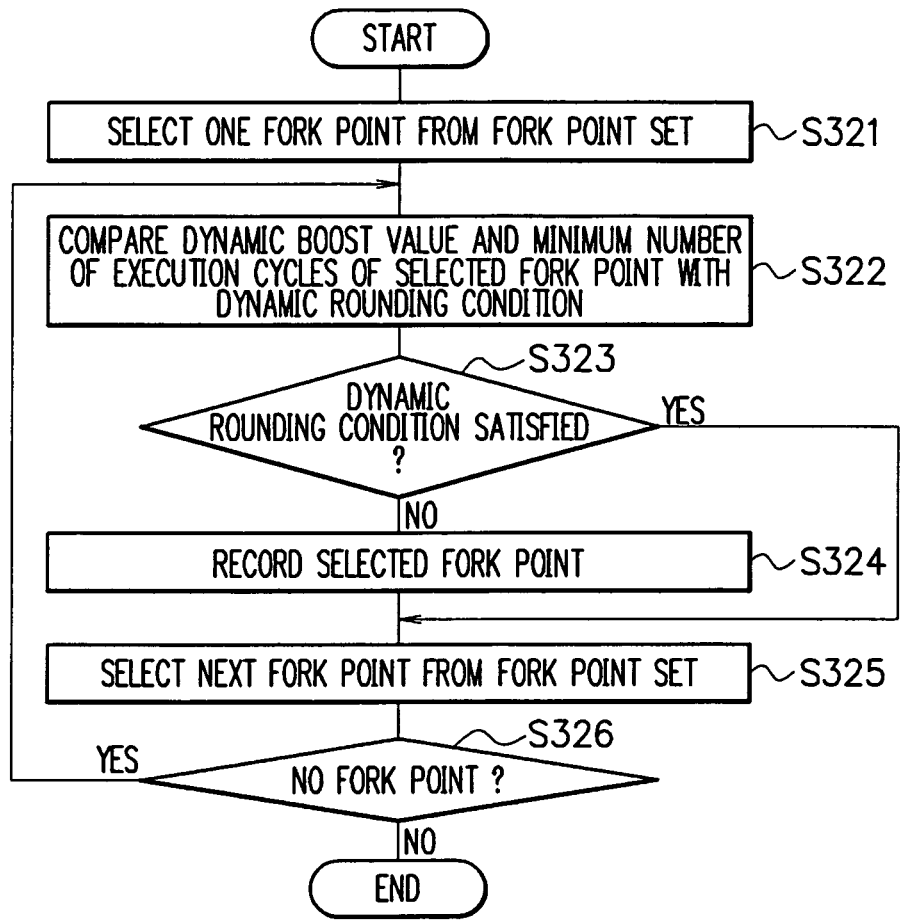
FIG. 14 is a flowchart showing an example of the operation of a dynamic rounding section in the program parallelizing apparatus according to the first embodiment of the present invention.

From the fork points included in the fork point set 1413 obtained by the fork point determination section 110, the dynamic rounding section 1232 removes fork points with a dynamic boost value and the minimum number of execution cycles satisfying the dynamic rounding condition 153 according to the dynamic fork information 1253 as fork points less contributing to parallel execution performance. The dynamic rounding section 1232 stores the remaining fork points in a storage area 1254M as a post-dynamic rounding fork point set 1254. FIG. 14 shows an example of the operation of the dynamic rounding section 1232.

As can be seen in FIG. 14, the dynamic rounding section 1232 selects a fork point in the fork point set 1413 (step S321) to compare the dynamic boost value and the minimum number of execution cycles thereof in the dynamic fork information 1253 with the dynamic rounding condition 153 (step S322). If at least one of the dynamic boost value and the minimum number of execution cycles of the fork point satisfies the dynamic rounding condition 153 (step S323/Yes), the dynamic rounding section 1232 does not include the fork point in the post-dynamic rounding fork point set 1254. If both the dynamic boost value and the minimum number of execution cycles do not meet the dynamic rounding condition 153 (step S323/No), the dynamic rounding section 1232 includes the fork point in the post-dynamic rounding fork point set 1254 (step S324).

Having completed the process for the fork point, the dynamic rounding section 1232 selects another fork point in the fork point set 1413 (step S325), and repeats the process from step S322 through S324 for the next fork point. Having completed the same process as above for all fork points in the fork point set 1413 (step S326/No), the dynamic rounding section 1232 finishes the dynamic rounding based on the dynamic fork information 1253.

Examples of the dynamic rounding condition 153
  Dynamic rounding condition 1: (dynamic boost value/sequential execution cycles)<Md
  Dynamic rounding condition 2: the minimum number of cycles>Nd In dynamic rounding condition 1, "sequential execution cycles" indicates the total number of execution cycles for the sequential execution trace information segment 1252 from which the dynamic boost value has been obtained, that is, the number of sequential execution cycles N used for dividing the sequential execution trace information. Therefore, "dynamic boost value/sequential execution cycles" indicates the rate of the number of execution cycles reduced by the fork point to the total number of execution cycles. Fork points with the rate less than lower limit threshold value Md are removed for the same reason as in the case of static rounding condition 1. The setting of value Md depends on the architecture of a multi-threading parallel processor as a target, and is determined by, for example, preliminary experiments.

Fork points that satisfy dynamic rounding condition 2 are removed for the same reason as in the case of static rounding condition 2. The setting of value Nd depends on the architecture of a multithreading parallel processor as a target, and is determined by, for example, preliminary experiments.

A description will now be given of the initial combination determination section 1233.

Figure 15:
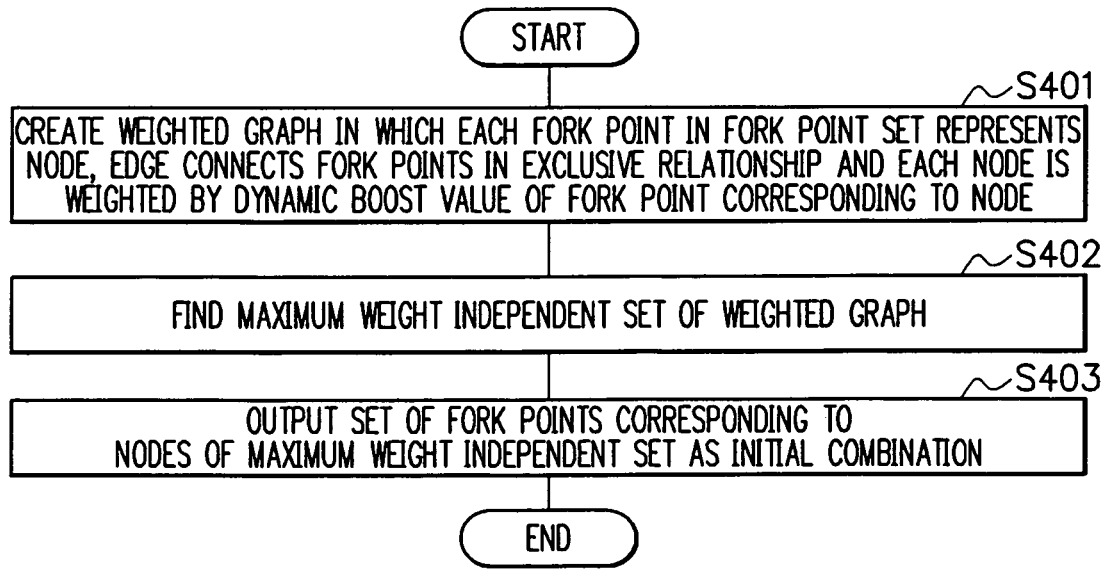
FIG. 15 is a flowchart showing an example of the operation of an initial combination determination section in the program parallelizing apparatus according to the first embodiment of the present invention.

The initial combination determination section 1233 receives as input the post-dynamic rounding fork point set 1254 and exclusive fork sets and dynamic boost values in the dynamic fork information 1253. Based on the information, the initial combination determination section 1233 creates as an initial combination 1255 a combination of fork points with the maximum sum of dynamic boost values which does not cause cancellation, and stores the combination 1255 in a storage area 1255M. FIG. 15 shows an example of the operation of the initial combination determination section 1233.

As can be seen in FIG. 15, the initial combination determination section 1233 generates a weighted graph (step S401). In the weighted graph, each fork point contained in the post-dynamic rounding fork point set 1254 represents a node, an edge connects fork points in an exclusive relationship, and each node is weighted by the dynamic boost value of a fork point corresponding to the node. A determination as to whether or not fork points are in an exclusive relationship is made by referring to an exclusive fork set of each fork point in the dynamic fork information 1253. The dynamic boost value at each fork point is obtained by also referring to the dynamic fork information 1253.

It is assumed that a fork point set includes five fork points $f_1[15]$, $f_2[7]$, $f_3[10]$, $f_4[5]$, and $f_5[8]$ as shown on the left side of FIG. 16 (a). A numeric in brackets indicates a dynamic boost value. In FIG. 16 (a), fork points connected by a broken line are in an exclusive relationship. A weighted graph for such a fork point set is shown on the right side of FIG. 16 (a).

The initial combination determination section 1233 finds a maximum weight independent set of the weighted graph (step S402). The maximum weight independent set is a set of non-adjacent or independent vertices with the maximum sum of weights. An example of the solution to find a maximum weight independent set will be described later. In FIG. 16 (b), a solution to the maximum weight independent set is shown as a set including two vertices indicated by black circles in a graph on the right side.

The initial combination determination section 1233 stores a set of fork points corresponding to the nodes of the maximum weight independent set as an initial combination 1255 in the storage area 1255M (step S403). In the case of FIG. 16.(b), the initial combination is a set including $f_1[15]$ and $f_5[8]$ as shown on the right side of FIG. 16 (a).

In the following, a description will be given of an example of a solution to find a maximum weight independent set.

Figures 1, 17:
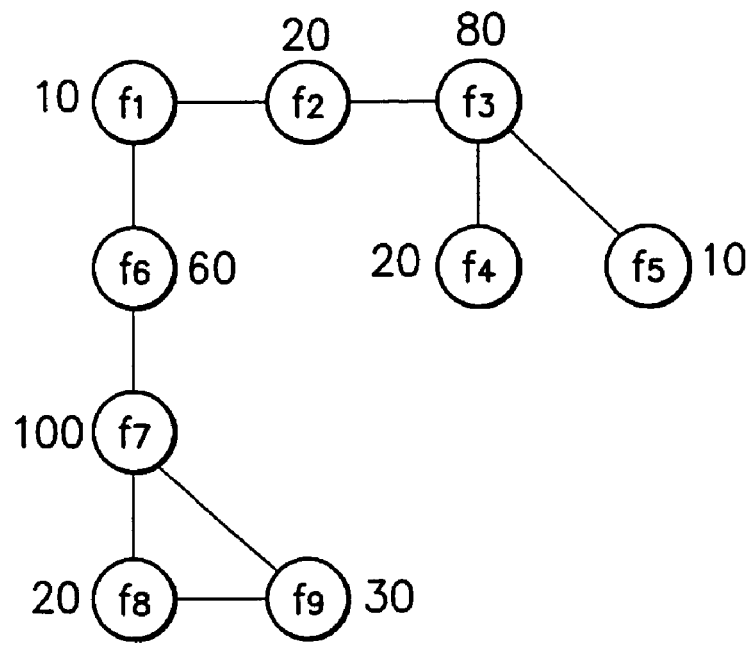
Figures 2, 17:
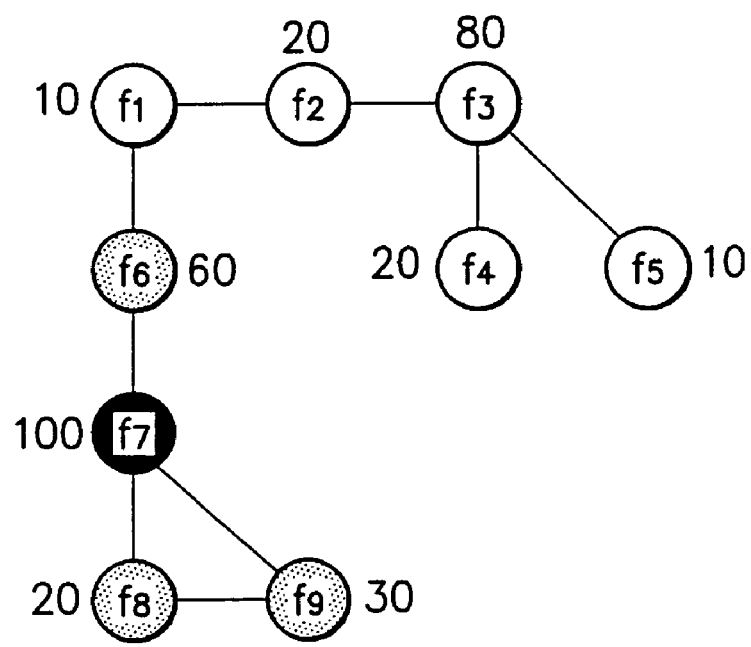
Figures 3, 17:
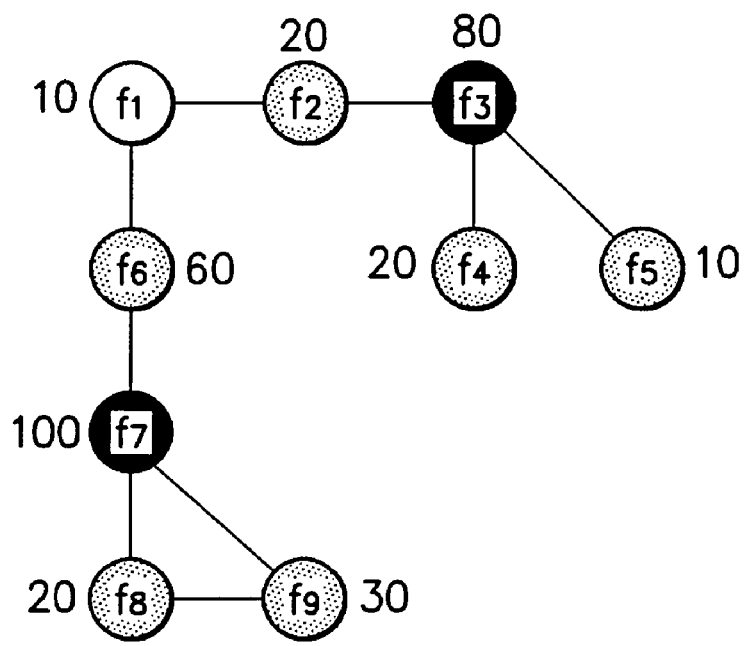
Figures 4, 17:
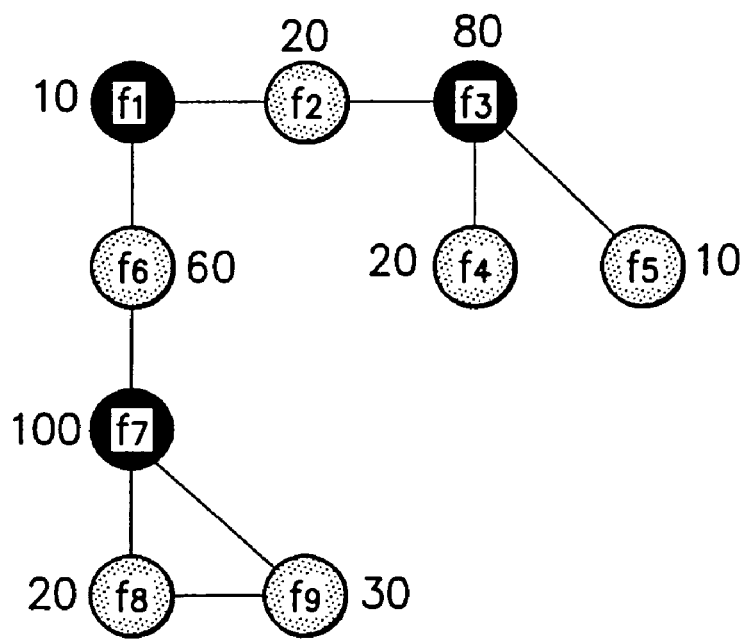

FIG. 17-1 shows an example of a weighted graph. In the graph, each node represents a fork point, a numeral beside a node indicates the weight of the node (i.e., a dynamic boost value), and an edge connecting nodes represents an exclusive relationship.

A maximum weight independent set can be found by the approximation algorithm as, for example, as follows:
  1. Select a node with the maximum weight from the nodes which have not been selected or removed.
  2. Remove nodes connected to the node selected by step 1 from the graph.
  3. Repeat steps 1 and 2 until no selectable nodes remain.

Referring next to the graph of FIG. 17-1, a description will be given of an example of a solution to find a maximum weight independent set according to the algorithm.

First, fork point $f_7$ of the maximum weight is selected. All nodes adjacent to fork point $f_7$ are removed. FIG. 17-2 shows a weighted graph at this point. A black node represents a selected node, and gray nodes represent removed nodes.

Next, fork point $f_3$ as a node with the maximum weight is selected in similar fashion from the nodes which have not been selected or removed. FIG. 17-3 shows a weighted graph after the selection.

Thereafter, last remaining fork point $f_1$ is selected, and the process is completed. FIG. 17-4 shows a weighted graph at this point. Resultantly, there have been selected three fork points $f_1$, $f_3$, and $f_7$.

In the following, a description will be given of the combination improvement section 1234.

Figure 18:
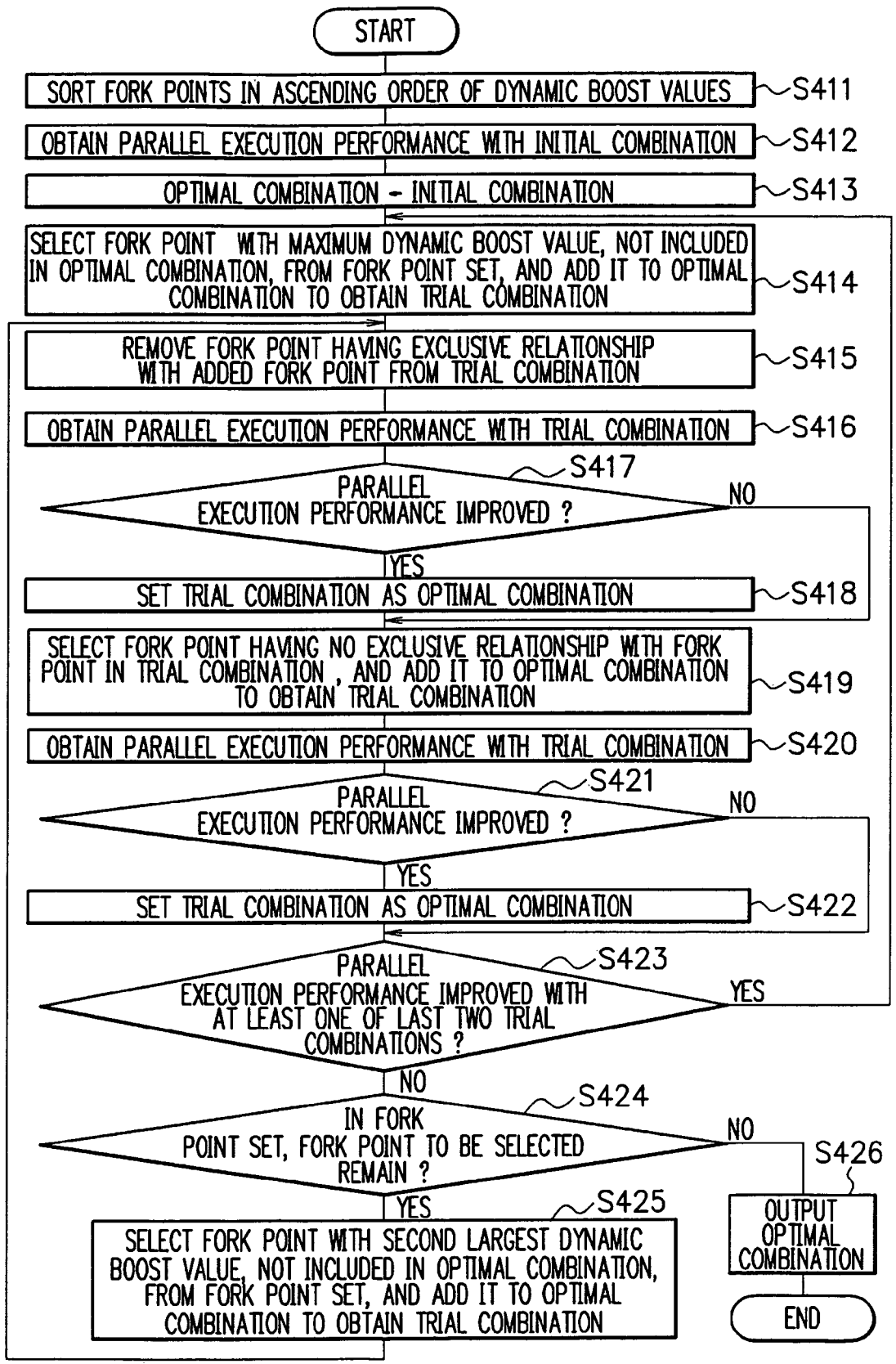
FIG. 18 is a flowchart showing an example of the operation of a combination improvement section in the program parallelizing apparatus according to the first embodiment of the present invention.

The combination improvement section 1234 receives as input the initial combination 1255 obtained by the initial combination determination section 1233, the post-dynamic rounding fork point set 1254, the sequential processing program 1151 and the control/data flow analysis result 1152 in the intermediate data 141. Using the initial combination 1255 as an initial solution, the combination improvement section 1234 retrieves an optimal combination 1256 which is a fork point set with better parallel execution performance, and writes the optimal combination 1256 to a storage area 1256M. In other words, the combination improvement section 1234 retrieves a trial combination obtained by slightly modifying the initial combination 1255. If a trial combination with better parallel execution performance is acquired, the combination improvement section 1234 uses the trial combination as an initial solution for subsequent retrieval. That is, the combination improvement section 1234 retrieves the optimal solution based on a so-called iterative improvement method. FIG. 18 shows an example of the operation of the combination improvement section 1234.

The combination improvement section 1234 first sorts fork points in the post-dynamic rounding fork point set 1254 in ascending order of their dynamic boost values (step S411). The combination improvement section 1234 then simulates parallel execution using the initial combination 1255 to acquire parallel execution performance (e.g., the number of execution cycles) with the combination 1255 (step S412). The parallel execution based on the initial combination 1255 can be performed with the sequential execution trace information segment 1252. More specifically, to obtain the number of execution cycles, the combination improvement section 1234 simulates the operation performed when the sequential execution trace information segments 1252 are parallelized at a fork point contained in the initial combination 1255 by referring to the control/data flow analysis result of the sequential processing program 1151 in the intermediate data 141 and the number of processors of a multithreading parallel processor as a target. Obviously, there may be employed another method. For example, based on fork points in the initial combination 1255, the operation of a parallelized program produced from the sequential processing program 1151 may be simulated by a multithreading parallel processor as a target or a simulator with particular input data to obtain the total number of execution cycles.

Next, the combination improvement section 1234 defines the initial combination 1255 as an optimal combination at this point (step S413) to find an optimal solution based on an iterative improvement method.

The combination improvement section 1234 selects a fork point with the maximum dynamic boost value which is not included in the optimal combination from the post-dynamic rounding fork point set 1254 after the sort. The combination improvement section 1234 adds the selected fork point to the optimal combination to obtain a trial combination (step S414). The combination improvement section 1234 checks if the trial combination includes a fork point having an exclusive relationship with the fork point added to the optimal combination. When such a fork point is present in the trial combination, the combination improvement section 1234 removes the fork point therefrom (step S415). The combination improvement section 1234 simulates parallel execution using the trial combination to acquire parallel execution performance with the trial combination (step S416).

The combination improvement section 1234 compares parallel execution performance between the trial combination and the optimal combination to determine whether or not the trial combination is superior in parallel execution performance, or parallel execution performance has improved (step S417). If parallel execution performance has improved (step S417/Yes), the combination improvement section 1234 sets the trial combination as a new optimal combination (step S418), and the process proceeds to step S419. Otherwise (step S417/No), the process proceeds to step S419 without a change in the optimal combination.

The combination improvement section 1234 selects a fork point with the maximum dynamic boost value which does not have an exclusive relationship with any fork point contained in the current trial combination from the post-dynamic rounding fork point set 1254 after the sort. The combination improvement section 1234 adds the selected fork point to the current optimal combination to obtain a new trial combination (step S419), and simulates parallel execution using the trial combination to acquire parallel execution performance with the trial combination (step S420).

Subsequently, the combination improvement section 1234 compares parallel execution performance between the trial combination and the optimal combination to determine whether or not the trial combination is superior in parallel execution performance, or parallel execution performance has improved (step S421). If parallel execution performance has improved (step S421/Yes), the combination improvement section 1234 sets the trial combination as a new optimal combination (step S422), and the process proceeds to step S423. Otherwise (step S421/No), the process proceeds to step S423 without a change in the optimal combination.

The combination improvement section 1234 determines whether or not parallel execution performance has improved with at least one of the last two trial combinations (step S423). If parallel execution performance has improved with at least one of the two (step S423/Yes), the process returns to step S414, and the combination improvement section 1234 continues the search for a better combination with the improved optimal combination.

If the parallel execution performance has not improved with both the last two trial combinations (step S423/No), the combination improvement section 1234 determines whether or not the post-dynamic rounding fork point set 1254 still contains a fork point to be selected (step S424). If such a fork point still remains (step S424/Yes), the combination improvement section 1234 selects a fork point with the second largest dynamic boost value which is not contained in the current optimal combination from the post-dynamic rounding fork point set 1254 after the sort. The combination improvement section 1234 adds the selected fork point to the current optimal combination to obtain a new trial combination (step S425). After that, the process returns to step S415, and the combination improvement section 1234 repeats the same process as above described. On the other hand, if the post-dynamic rounding fork point set 1254 contains no fork point to be selected (step S424/No), the combination improvement section 1234 determines that no more improvement is possible, and writes the current optimal combination as the optimal combination 1256 to the storage area 1256M (step S426).

In the following, the integration section 124 will be described.

Figures 1, 19:
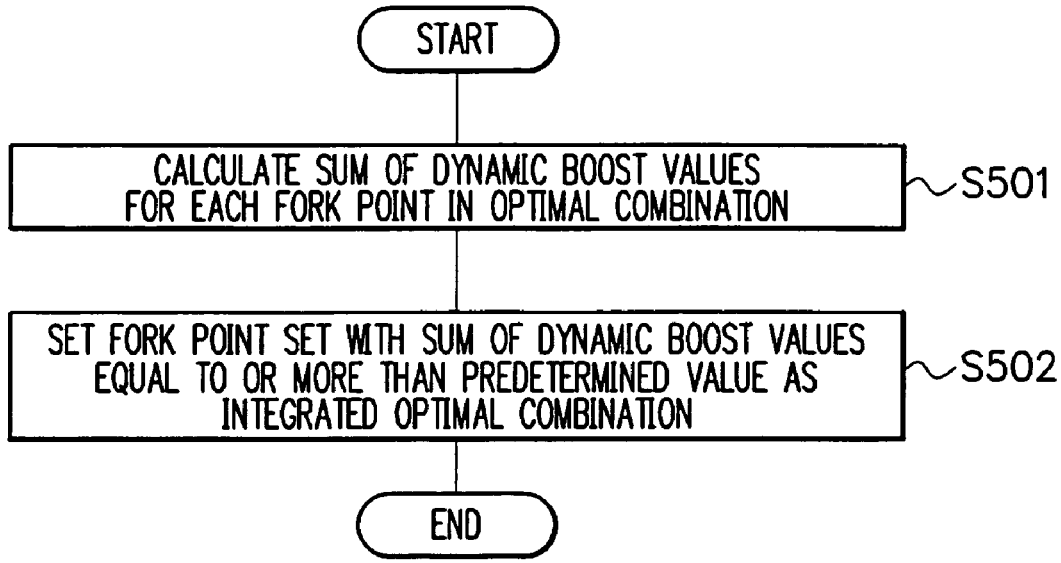
Figures 2, 19:
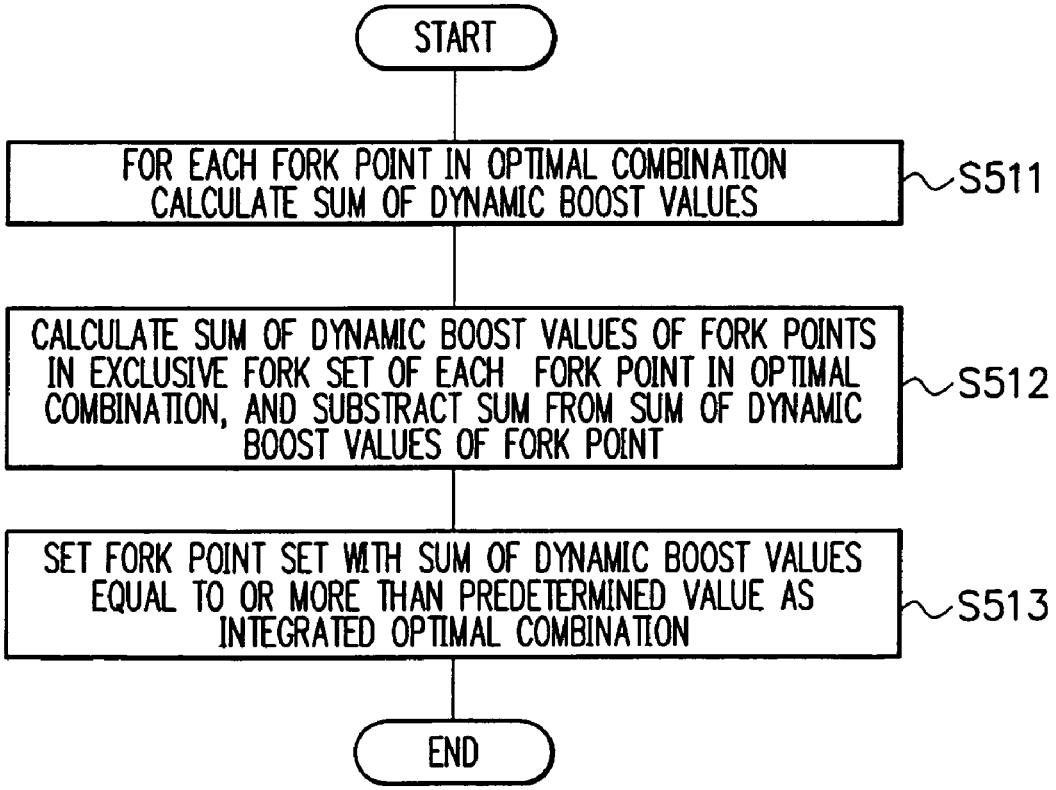
Figures 3, 19:
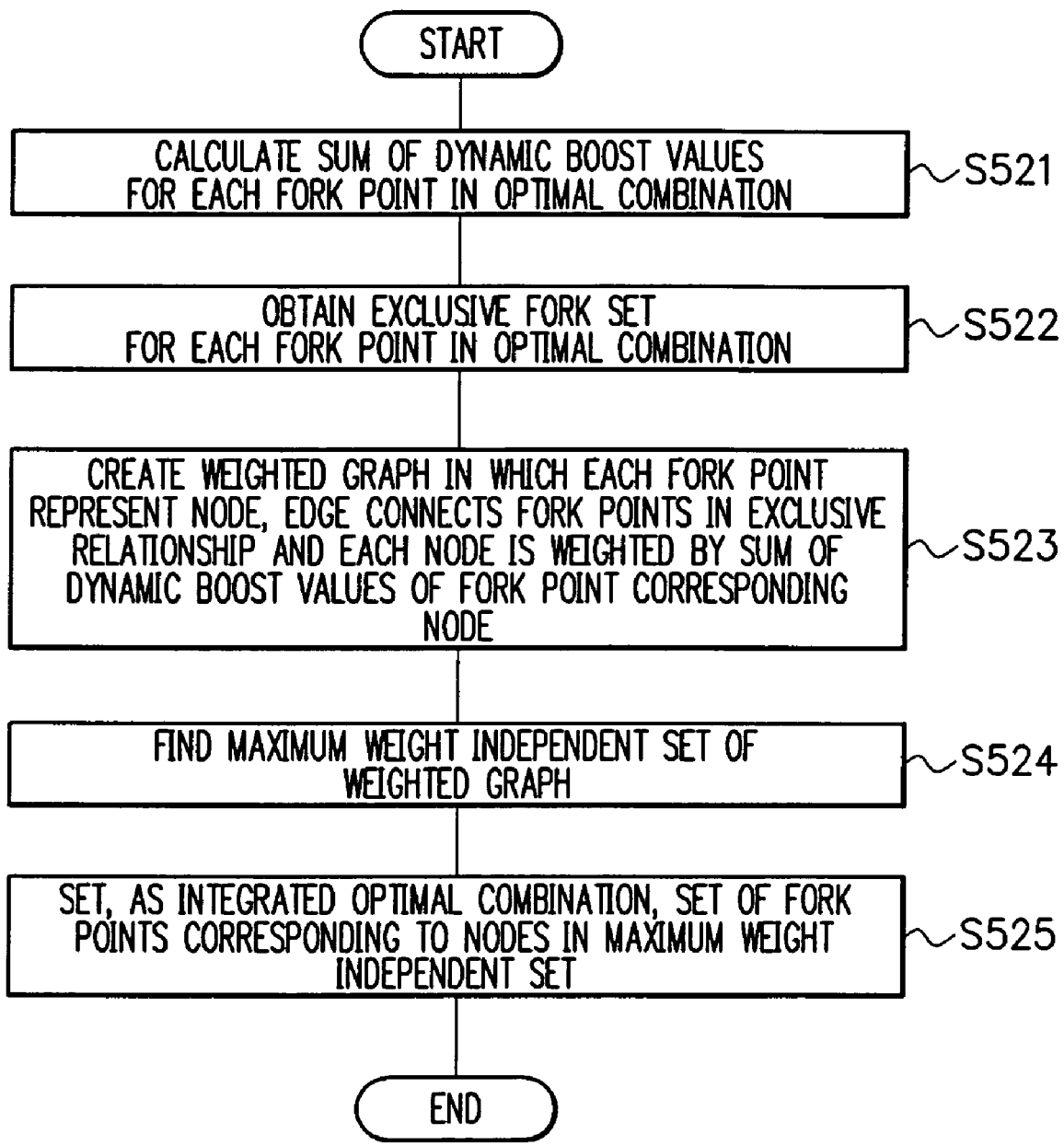

The integration section 124 integrates the optimal combinations in the respective sequential execution trace information segments obtained by the combination improvement section 1234 of the repeat section 123 into one optimal combination according to an appropriate criterion, and stores the combination as an integrated optimal combination 1421 in a storage area 1421M. FIGS. 19-1 to 19-3 show examples of the operation of the integration section 124.

In FIG. 19-1, the integration section 124 calculates the sum of dynamic boost values with respect to each fork point in the optimal combination 1256 (step S501). If it is assumed that there exist three optimal combinations 1256: A0, A1, and A2, among which only A0 and A1 contains fork point $f_1$, and, in dynamic fork information, the dynamic boost value of fork point $f_1$ used to create A0 is 20, while that used to create A1 is 30. In this case, the sum of the dynamic boost values of fork point f1 is 50.

Thereafter, the integration section 124 designates a set of fork points with the sum of dynamic boost values equal to or more than a predetermined value as an integrated optimal combination (step S502). As an example of the predetermined value may be cited the average of the sums of dynamic boost values with respect to all fork points.

In FIG. 19-2, the integration section 124 integrates the optimal combinations in consideration of exclusive fork sets differently from the case of FIG. 19-1. More specifically, as in the same manner as described previously in connection with FIG. 19-1, the integration section 124 calculates the sum of dynamic boost values with respect to each fork point in the optimal combination 1256 (step S511). Next, the integration section 124 calculates the sum of dynamic boost values of each fork point contained in an exclusive fork set associated with the fork point, and subtracts it from the sum of the boost values of the fork point (step S512). It is assumed, in the aforementioned example, that fork points $f_2$ and $f_3$ having an exclusive relationship with fork point $f_1$ exists in A2, and the sums of dynamic boost values calculated in step S511 for fork points $f_2$ and $f_3$ are 10 and 15, respectively. The sum of them: 10+15=25 is subtracted from the sum of dynamic boost values: 50 of fork point $f_1$.

Subsequently, the integration section 124 designates a set of fork points with the sum of dynamic boost values equal to or more than a predetermined value as an integrated optimal combination (step S513). The predetermined value may be, for example, 0 (zero).

In FIG. 19-3, the integration section 124 integrates the optimal combinations into an integrated optimal combination with a high degree of accuracy. As in the same manner as described previously in connection with FIG. 19-1, the integration section 124 calculates the sum of dynamic boost values with respect to each fork point in the optimal combination 1256 (step S521). Subsequently, with respect to each fork point in the optimal combination 1256, the integration section 124 obtains an exclusive fork set. In the aforementioned example, among all optimal combinations, fork points $f_2$ and $f_3$ each have an exclusive relationship with fork point $f_1$. That is, the exclusive fork set of fork point $f_1$ consist of fork points $f_2$ and $f_3$.

From fork points in all the optimal combinations 1256, the program creates a combination of fork points, which are not in an exclusive relationship, with the maximum sum of dynamic boost values, and defines the combination as the integrated optimal combination 1421 (steps S523 to S525). More specifically, as a maximum weight independent set problem, the integrated optimal combination is obtained. First, the integration section 124 generates a weighted graph in which each fork point in the optimal combination 1256 represents a node and an edge connects fork points in an exclusive relationship. In the graph, each node is weighted by the sum of dynamic boost values of a fork point corresponding to the node (step S523). The integration section 124 finds a maximum weight independent set of the weighted graph (step S524). After that, the integration section 124 sets, as an integrated optimal combination, a set of fork points corresponding to nodes included in the maximum weight independent set (step S525).

A description will now be given in detail of the parallelized program output section 130.

Referring to FIG. 20, the parallelized program output section 130 includes a post-processing section 131, a fork command insertion section 132, and a work area 133 in, for example, a storage 105.

The post-processing section 131 receives as input the sequential processing program 1151 included in the intermediate data 141, the control/data flow analysis result 1152, and the integrated optimal combination 1421 in the intermediate data 142. The post-processing section 131 performs post-processing to mitigate adverse effects on the sequential performance of each thread due to instruction relocation by the program converter 1112 in the fork point determination section 110. The post-processing section 131 writes a sequential processing program 1331 which has undergone the post-processing to a storage area 1331M of the work area 133.

More specifically, the post-processing section 131 rearranges instructions or commands, under the condition that instructions be not exchanged across the fork source point or the fork destination point of the fork point contained in the integrated optimal combination 1421, in such a manner as to provide as much interval as possible between instructions with a data dependency. In other words, instructions are rearranged so that the lifetime or alive time of each variable is increased. The post-processing corresponds to the instruction scheduling function of an existing compiler for increasing the interval from write operation to a register to read operation therefrom as much as possible to the extent that the data dependency can be maintained, on which is imposed the condition that instructions be not exchanged across the fork source point or the fork destination point of a fork point.

If the program converter 1112 has rearranged instructions such that as less interval as possible is provided between instructions with a data dependency, or the lifetime of each variable is reduced, it is likely that sequential processing performance is lowered. Therefore, the post-processing section 131 operates as above to thereby minimize adverse effects.

The fork command insertion section 132 receives as input the sequential processing program 1331 after the post-processing and the integrated optimal combination 1421 in the intermediate data 142 to place a fork command at each fork point contained in the combination 1421. The fork command insertion section 132 thereby creates the parallelized program 103 from the sequential processing program 1331, and stores the program 103 in the storage area 103M.

Second Embodiment

Figures 1, 21:
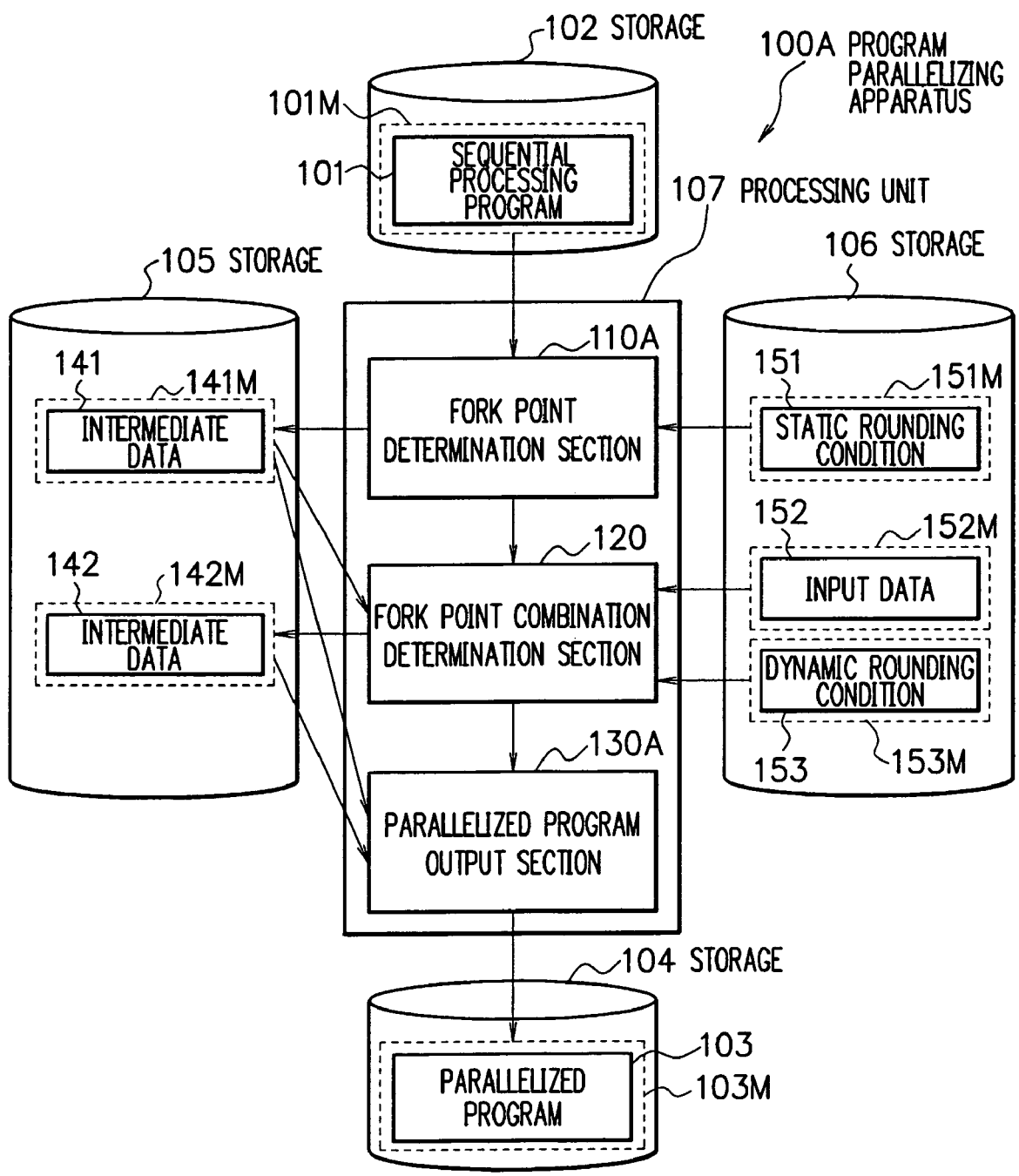
Figures 2, 21:
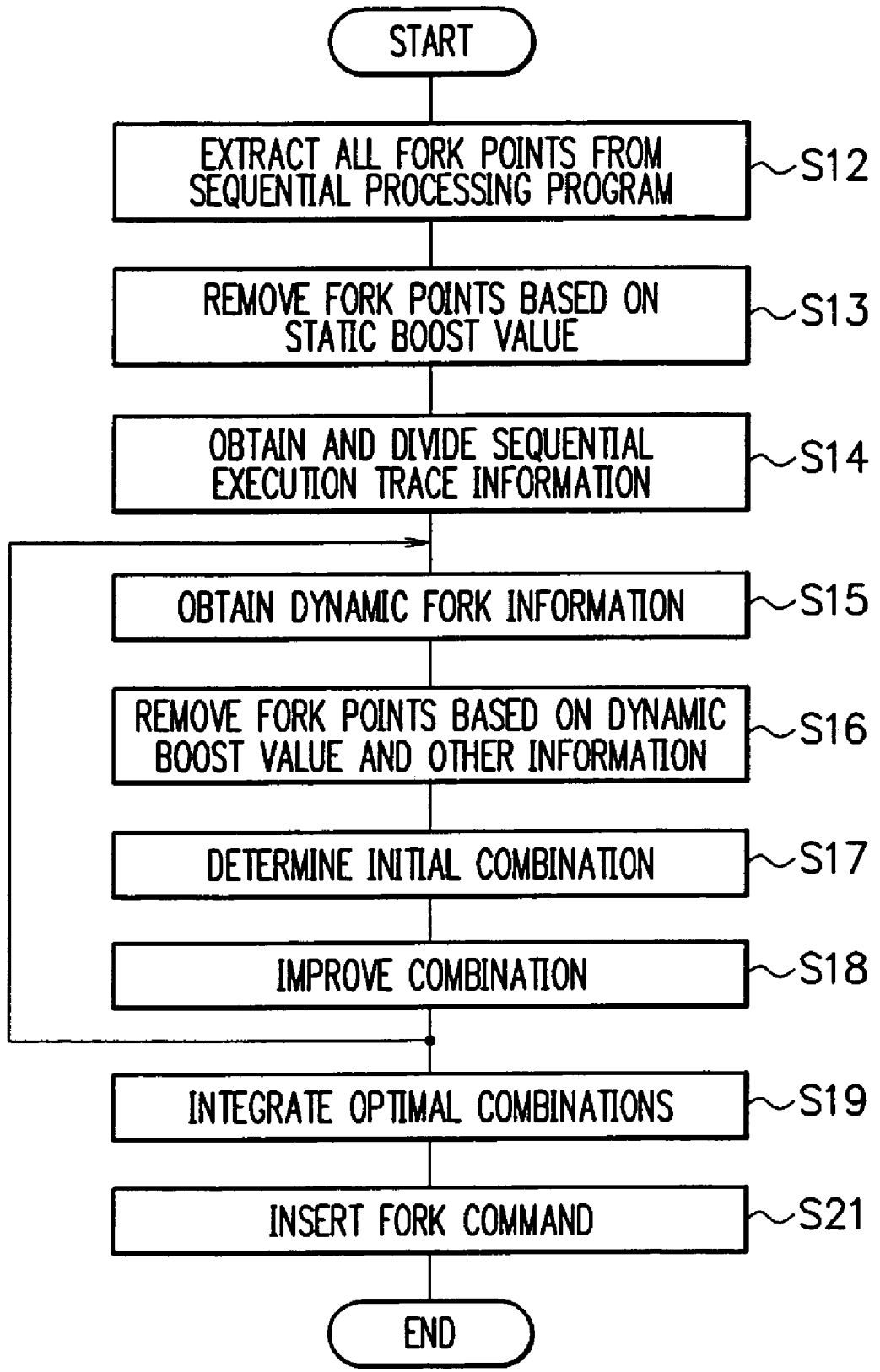

FIG. 21-1 shows a program parallelizing apparatus according to the second embodiment of the present invention.

Referring to FIG. 21-1, the program parallelizing apparatus 100A of the second embodiment is basically similar to the program parallelizing apparatus 100 of the first embodiment except with a fork point determination section 110A and a parallelized program output section 130A in place of the fork point determination section 110 and the parallelized program output section 130.

The fork point determination section 110A does not include components for program conversion such as the program converter 1112 and the work area 114 differently from the fork point determination section 110 of FIG. 4. Besides, the parallelized program output section 130A does not include components for post-processing such as the post-processing section 131 and the work area 133 differently from the parallelized program output section 130 of FIG. 20. The parallelized program output section 130A produces a parallelized program from the input sequential processing program 101.

Referring to FIG. 21-2, when the program parallelizing apparatus 100A of this embodiment is activated, the fork point determination section 110A of the processing unit 107 analyzes the sequential processing program 101, and extracts all fork points from the program 101 based on the control/data flow analysis result (step S12). The fork point determination section 110A removes those with a static boost value satisfying the static rounding condition 151 from the fork points (step S13).

Subsequently, the fork point combination determination section 120 operates in the same manner as described previously for the first embodiment (steps S15 to S19). After that, the parallelized program output section 130A inserts a fork command into the sequential processing program 101 based on the optimal fork point combination determined by the fork point combination determination section 120 to create the parallelized program 103 (step S21).

Third Embodiment

Figures 1, 22:
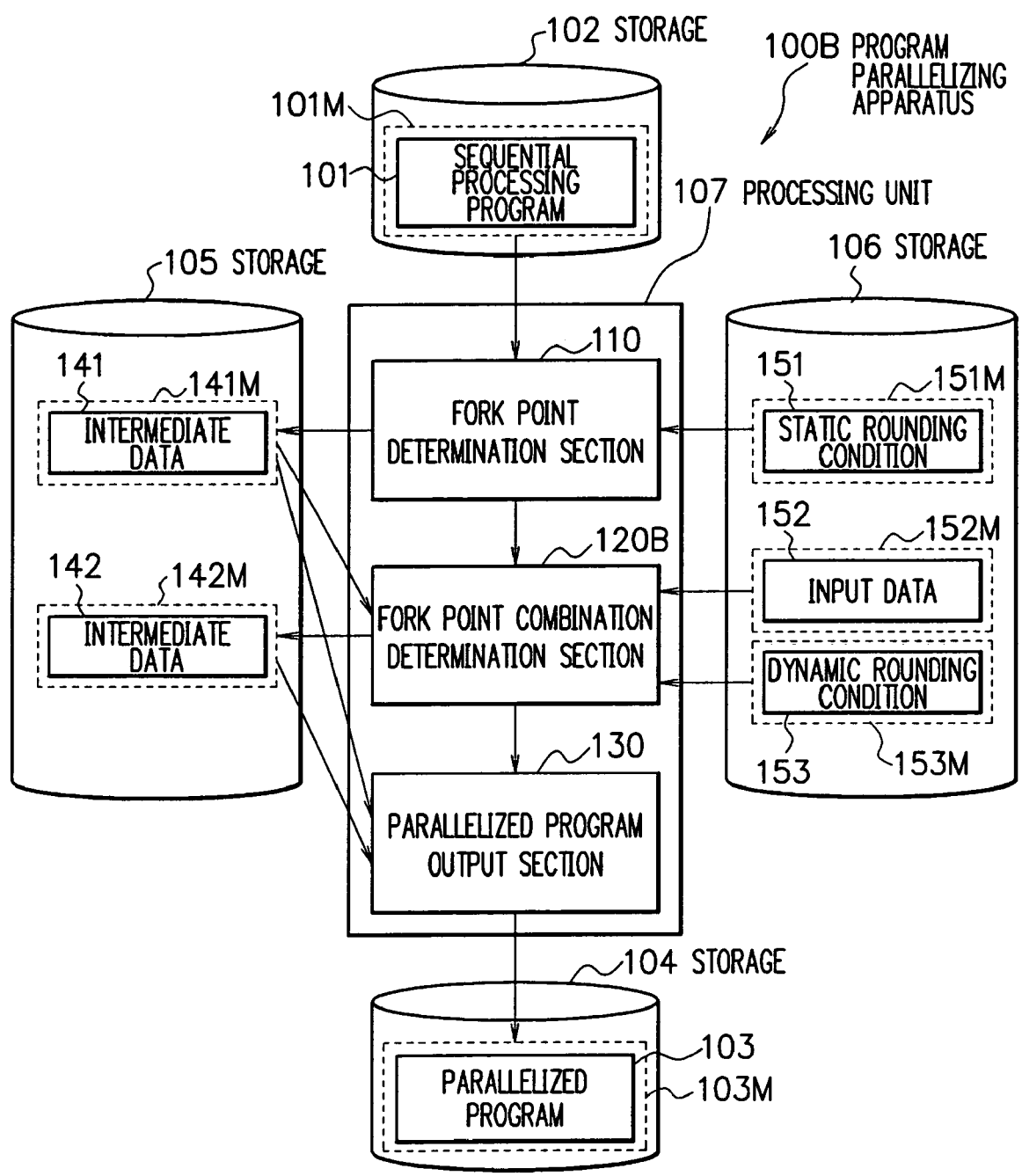
Figures 2, 22:
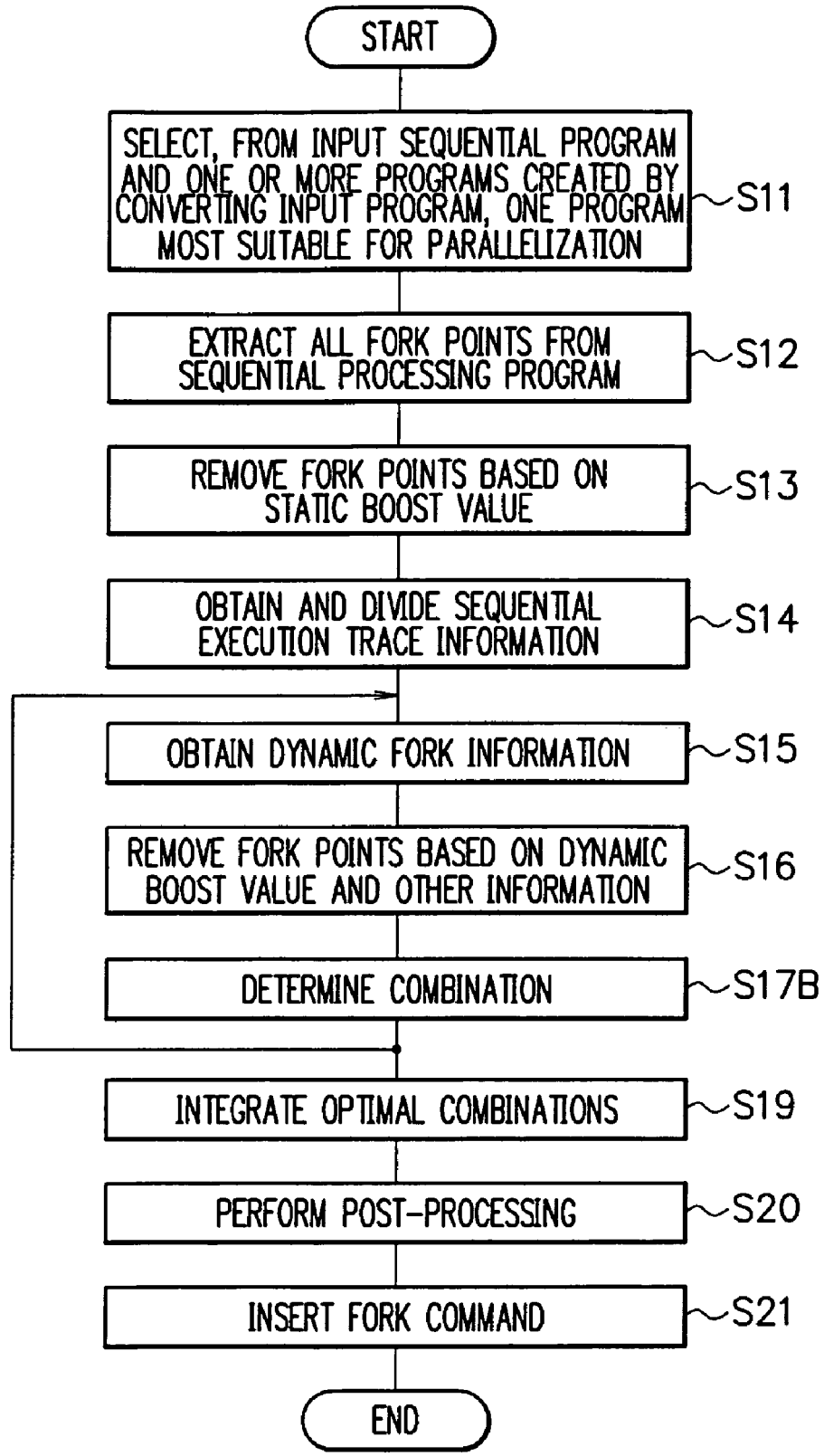

FIG. 22-1 shows a program parallelizing apparatus according to the third embodiment of the present invention.

Referring to FIG. 22-1, the program parallelizing apparatus 100B of the third embodiment is basically similar to the program parallelizing apparatus 100 of the first embodiment except with a fork point combination determination section 120B in place of the fork point combination determination section 120.

The fork point combination determination section 120B includes, in place of the initial combination determination section 1233 of the repeat section 123 in the fork point combination determination section 120 shown in FIG. 12, a simplified initial combination determination section.

As can be seen in FIG. 22-2, when the program parallelizing apparatus 100B of this embodiment is activated, the fork point determination section 110 of the processing unit 107 operates in the same manner as described previously for the first embodiment (steps S11 to S13).

Subsequently, the fork point combination determination section 120B of the processing unit 107 generates sequential execution trace information gathered while the sequential processing program suitable for parallelization determined by the fork point determination section 110 is being executed according to the input data 152, and divides the information into segments (step S14). The fork point combination determination section 120B repeats the process from step S15 through S17B for the respective sequential execution trace information segments. The fork point combination determination section 120B obtains a dynamic boost value, the minimum number of execution cycles and an exclusive fork set as dynamic fork information from the sequential execution trace information segment with respect to each fork point included in the fork point set obtained by the fork point determination section 110 (step S15). The fork point combination determination section 120B compares the dynamic boost value and the minimum number of execution cycles with the dynamic rounding condition 153, and removes fork points satisfying the condition 153 (step S16). The fork point combination determination section 120B creates an initial combination of some fork points top in the amount of the dynamic boost value from the fork points after the dynamic rounding (step S17B) and, using the initial combination as an initial solution, finds an optimal combination based on an iterative improvement method. The fork point combination determination section 120B integrates the optimal combinations in the respective sequential execution trace information segments according to an appropriate criterion to generate one optimal fork point combination (step S19).

After that, the parallelized program output section 130 operates in the same manner as described previously for the first embodiment (steps S20 and S21).

Fourth Embodiment

Figures 1, 23:
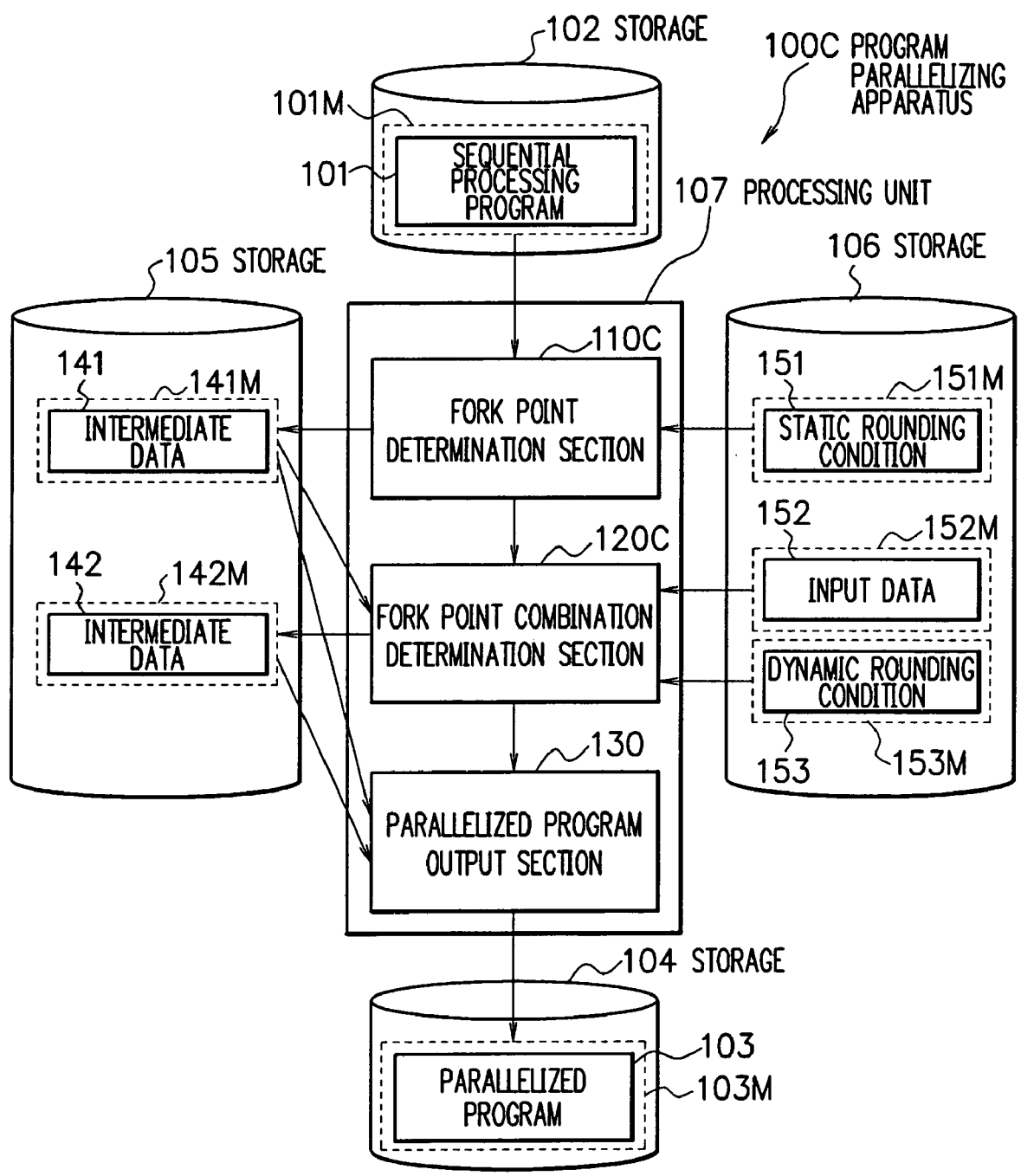
Figures 2, 23:
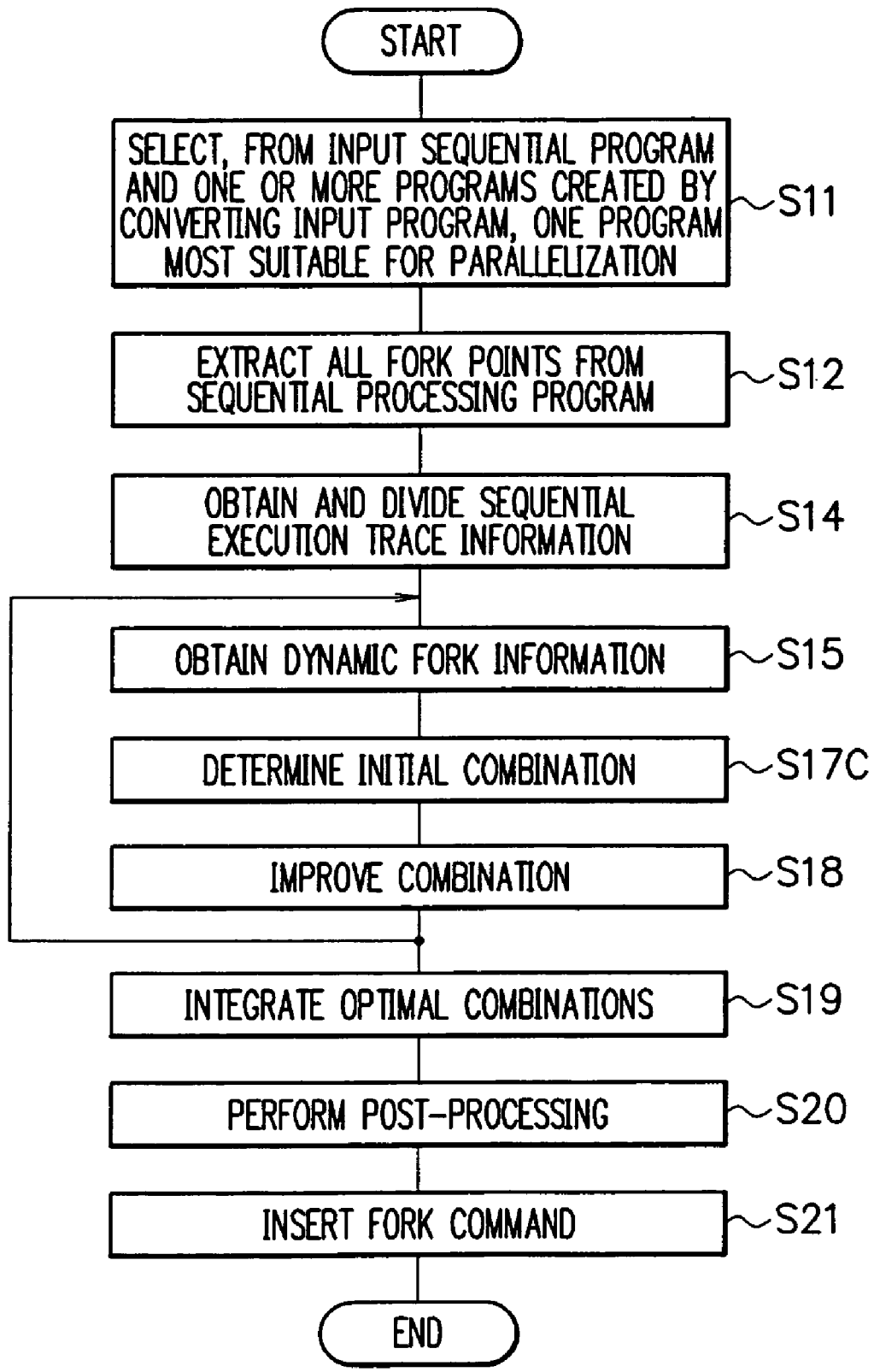

FIG. 23-1 shows a program parallelizing apparatus according to the fourth embodiment of the present invention.

Referring to FIG. 23-1, the program parallelizing apparatus 100C of the fourth embodiment is basically similar to the program parallelizing apparatus 100 of the first embodiment except with a fork point determination section 110C and a fork point combination determination section 120C in place of the fork point determination section 110 and the fork point combination determination section 120.

The fork point determination section 110C does not include the static rounding section 112 differently from the fork point determination section 110 shown in FIG. 4. Besides, the fork point combination determination section 120C does not include the dynamic rounding section 1232 differently from the fork point combination determination section 120 shown in FIG. 12.

As can be seen in FIG. 23-2, when the program parallelizing apparatus 100C is activated, the fork point determination section 110C of the processing unit 107 analyzes the sequential processing program 101 and at least one sequential processing program obtained by converting an instruction sequence in part of the program 101 into another instruction sequence equivalent thereto. The fork point determination section 110C selects a sequential processing program most suitable for parallelization from the sequential processing programs (step S11). The fork point determination section 110C extracts all fork points from the selected sequential processing program (step S12).

Subsequently, the fork point combination determination section 120C of the processing unit 107 generates sequential execution trace information gathered while the sequential processing program suitable for parallelization determined by the fork point determination section 110C is being executed according to the input data 152, and divides the information into segments (step S14). The fork point combination determination section 120C repeats the process steps S15, S17C and S18 for the respective sequential execution trace information segments. The fork point combination determination section 120C obtains a dynamic boost value, the minimum number of execution cycles and an exclusive fork set as dynamic fork information from the sequential execution trace information segment with respect to each fork point included in the fork point set obtained by the fork point determination section 110C (step S15). Among the fork points included in the fork point set obtained by the fork point determination section 110C, the fork point combination determination section 120C creates an initial combination of fork points with excellent parallel execution performance from tracepoints that appear in the sequential execution trace information segment (step S17C). Using the initial combination as an initial solution, the fork point combination determination section 120C finds an optimal combination based on an iterative improvement method (step S18). The fork point combination determination section 120C integrates the optimal combinations in the respective sequential execution trace information segments according to an appropriate criterion to generate one optimal fork point combination (step S19).

After that, the parallelized program output section 130 operates in the same manner as described previously for the first embodiment (steps S20 and S21).

In this embodiment, although both the static and dynamic rounding sections are omitted from the construction of the first embodiment, only either one of them may be eliminated.

Fifth Embodiment

Figures 1, 24:
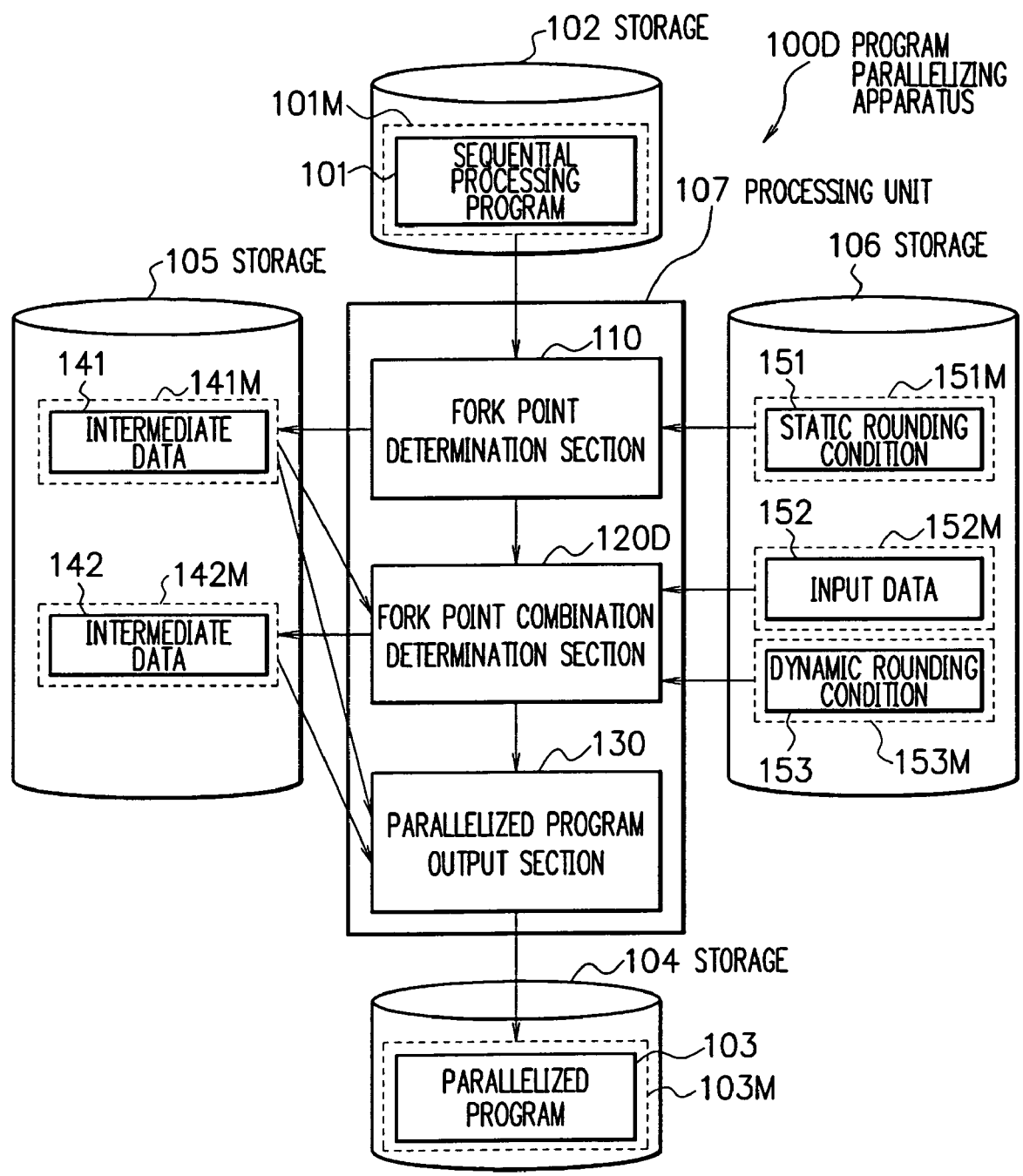
Figures 2, 24:
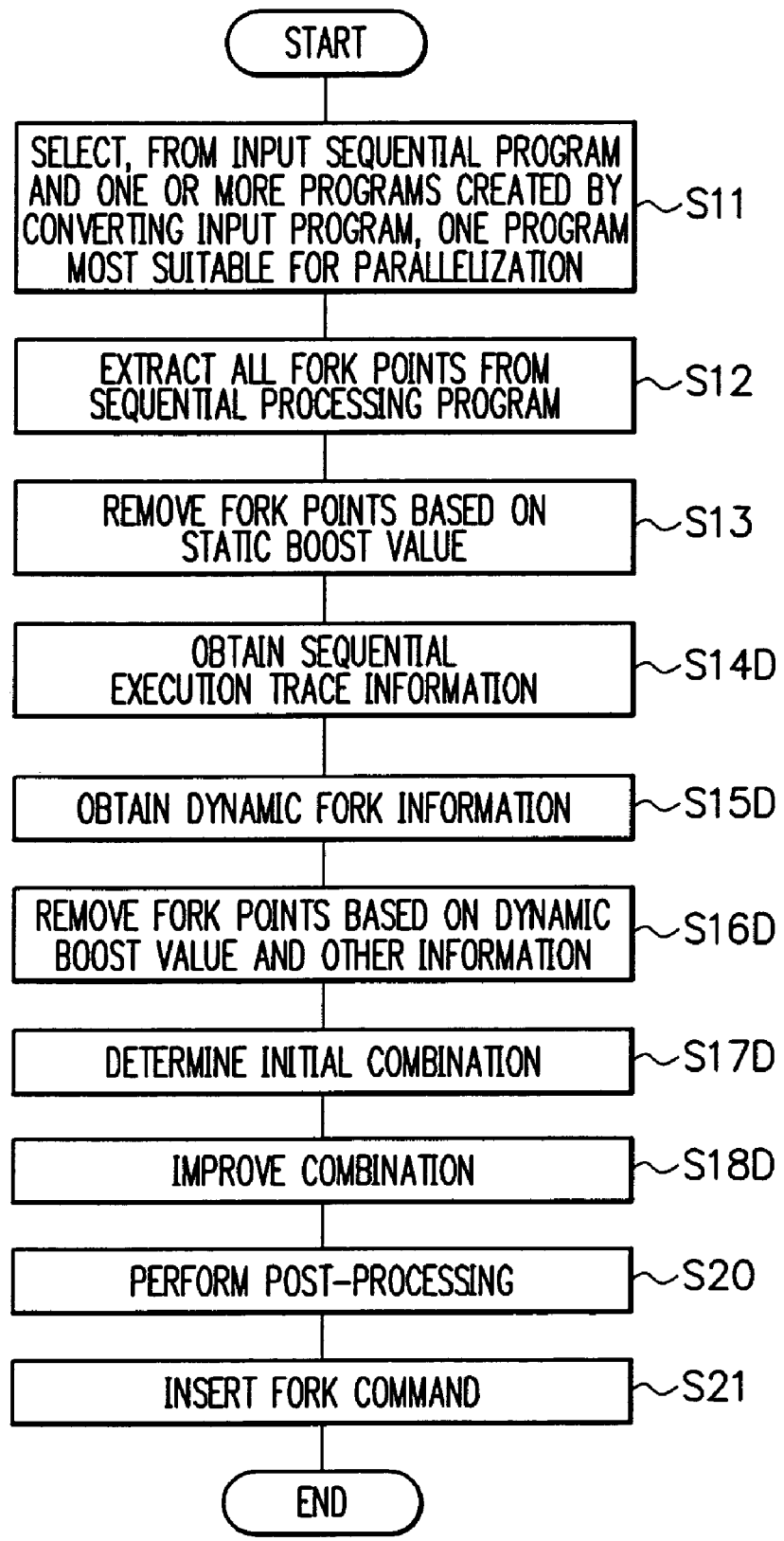

FIG. 24-1 shows a program parallelizing apparatus according to the fifth embodiment of the present invention.

Referring to FIG. 24-1, the program parallelizing apparatus 100D of the fifth embodiment is basically similar to the program parallelizing apparatus 100 of the first embodiment except with a fork point combination determination section 120D in place of the fork point combination determination section 120.

The fork point combination determination section 120D does not include the division section 122 and the integration section 124 differently from the fork point combination determination section 120 shown in FIG. 12. The fork point combination determination section 120D executes the sequential execution trace information as one block without dividing the information into segments.

As can be seen in FIG. 24-2, when the program parallelizing apparatus 100D of this embodiment is activated, the fork point determination section 110 of the processing unit 107 operates in the same manner as described previously for the first embodiment (steps S11 to S13).

Subsequently, the fork point combination determination section 120D generates sequential execution trace information gathered while the sequential processing program suitable for parallelization determined by the fork point determination section 110 is being executed according to the input data 152 (step S14D). The fork point combination determination section 120D obtains a dynamic boost value, the minimum number of execution cycles and an exclusive fork set as dynamic fork information from the sequential execution trace information with respect to each fork point included in the fork point set obtained by the fork point determination section 110 (step S15D). The fork point combination determination section 120D compares the dynamic boost value and the minimum number of execution cycles with the dynamic rounding condition 153 to remove fork points satisfying the condition 153 (step S16D). The fork point combination determination section 120D creates an initial combination of fork points with excellent parallel execution performance from the fork points after the dynamic rounding (step S17D) and, using the initial combination as an initial solution, finds an optimal combination based on an iterative improvement method (step S18D).

After that, the parallelized program output section 130 operates in the same manner as described previously for the first embodiment (steps S20 and S21).

While only in the fifth embodiment, the division section 122 and the integration section 124 are omitted from the construction of the fork point combination determination section 120 of the first embodiment, the same may be applied to the second, third, or fourth embodiment.

Incidentally, the embodiments described above are susceptible to various modifications, changes and adaptations. For example, the combination improvement section 1234 may be removed from the construction of each embodiment.

As set forth hereinabove, in accordance with the present invention, the fork point combination determination section creates a combination of fork points, which are not in an exclusive relationship, with the maximum sum of dynamic boost values from the fork points included in the fork point set. The combination approximates the optimal combination. Therefore, with the combination as an initial solution, the time taken to find a fork point combination with better parallel execution performance based on an iterative improvement method can be remarkably reduced.

In addition, the rounding section removes fork points less contributing to parallel execution performance at an early stage of processing. Consequently, the time required for subsequent processing such as to find the optimal fork point combination is reduced.

Thus, a parallelized program with high parallel execution performance can be produced at a high speed.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A program parallelizing apparatus for receiving a sequential processing program as input and producing a parallelized program for a multithreading parallel processor, comprising:

a fork point determination section for analyzing the sequential processing program to determine a set of fork points in the program;

a fork point combination determination section for determining an optimal combination of fork points included in the fork point set determined by the fork point determination section; and a parallelized program output section for creating a parallelized program for a multithreading parallel processor based on the optimal combination of fork points determined by the fork point combination determination section, wherein:

in the case where a particular fork point appears n times when the sequential processing program is executed with particular input data, a dynamic boost value for the particular fork point is defined as the sum of $C_1$, $C_2, \ldots,$ and $C_n$, where $C_1, C_2, \ldots,$ and $C_n$, respectively represent the number of execution cycles from a fork source to a fork destination point of the particular fork point at each appearance, and an exclusive fork set of the particular fork point is defined as a set of fork points other than the particular fork point which are not available concurrently with the particular fork point when the sequential processing program is executed with particular input data; and the fork point combination determination section includes:

a dynamic fork information acquisition section for obtaining the dynamic boost value and an exclusive fork set for each fork point when the sequential processing program is executed with particular input data;

a storage for storing the dynamic boost value and the exclusive fork set for each fork point;

a combination determination section for creating, by referring to the storage, a combination of fork points, which are not in an exclusive relationship according to the exclusive fork sets of the fork points, with a maximum sum of dynamic boost values; and a section for creating a weighted graph in which each fork point in the fork point set represents a node, an edge connects fork points in an exclusive relationship, and each node is weighted by the dynamic boost value of a fork point corresponding to the node.

2. The program parallelizing apparatus according to claim 1, wherein the combination determination section includes:

a section for obtaining a maximum weight independent set of the weighted graph; and a section for obtaining a set of fork points corresponding to nodes included in the maximum weight independent set to output the fork point set as a combination of fork points, which are not in an exclusive relationship, with the maximum sum of dynamic boost values.

3. The program parallelizing apparatus according to claim 2, wherein the fork point combination determination section further includes a combination improvement section for retrieving a combination of fork points with better parallel execution performance based on an iterative improvement method using the combination determined by the combination determination section as an initial solution.

4. A program parallelizing method, comprising the steps of:
  a) analyzing, by a fork point determination section, a sequential processing program to determine a set of fork points in the program;
  b) determining, by a fork point combination determination section, an optimal combination of fork points included in the fork point set determined by the fork point determination section; and
  c) creating, by a parallelized program output section, a parallelized program for a multithreading parallel processor based on the optimal combination of fork points determined by the fork point combination determination section, wherein:
  in the case where a particular fork point appears n times when the sequential processing program is executed with particular input data, a dynamic boost value for the particular fork point is defined as the sum of $C_1$, $C_2, \ldots,$ and $C_n$, where $C_1, C_2, \ldots,$ and $C_n$, the number of execution cycles from a fork source to a fork destination point of the particular fork point at each appearance, and an exclusive fork set of the particular fork point is defined as a set of fork points other than the particular fork point which are not available concurrently with the particular fork point when the sequential processing program is executed with particular input data; and
  the step b includes the steps of:
    b-1) obtaining, by a dynamic fork information acquisition section, the dynamic boost value and an exclusive fork set for each fork point when the sequential processing program is executed with particular input data;
    b-2) storing the dynamic boost value and the exclusive fork set for each fork point in a storage; and
    b-3) creating, by a combination determination section, a combination of fork points, which are not in an exclusive relationship according to the exclusive fork sets of the fork points, with a maximum sum of dynamic boost values by referring to the storage, said creating including creating a weighted graph in which each fork point in the fork point set represents a node, an edge connects fork points in an exclusive relationship, and each node is weighted by the dynamic boost value of a fork point corresponding to the node.

5. The program parallelizing method according to claim 4, wherein the step b-3 includes the steps of:
  obtaining a maximum weight independent set of the weighted graph; and
  obtaining a set of fork points corresponding to nodes included in the maximum weight independent set to output the fork point set as a combination of fork points, which are not in an exclusive relationship, with the maximum sum of dynamic boost values.

6. The program parallelizing method according to claim 5, wherein the step b further includes the step of retrieving a combination of fork points with better parallel execution performance based on an iterative improvement method using the combination determined in step b-3 as an initial solution.

7. program for a program parallelizing apparatus which receives a sequential processing program as input to produce a parallelized program for a multithreading parallel processor, implementing, by a computer, the sections of the program parallelizing apparatus including:
  a fork point determination section for analyzing the sequential processing program to determine a set of fork points in the program;
  a fork point combination determination section for determining an optimal combination of fork points included in the fork point set determined by the fork point determination section; and
  a parallelized program output section for creating a parallelized program for a multithreading parallel processor based on the optimal combination of fork points determined by the fork point combination determination section, wherein:
  in the case where a particular fork point appears n times when the sequential processing program is executed with particular input data, a dynamic boost value for the particular fork point is defined as the sum of $C_1$, $C_2, \ldots,$ and $C_n$, where $C_1, C_2, \ldots,$ and $C_n$, respectively represent the number of execution cycles from a fork source to a fork destination point of the particular fork point at each appearance, and an exclusive fork set of the particular fork point is defined as a set of fork points other than the particular fork point which are not available concurrently with the particular fork point when the sequential processing program is executed with particular input data; and
  the fork point combination determination section includes:
    a dynamic fork information acquisition section for obtaining the dynamic boost value and an exclusive fork set for each fork point when the sequential processing program is executed with particular input data, and storing them in a storage;
    a combination determination section for creating, by referring to the storage, a combination of fork points, which are not in an exclusive relationship according to the exclusive fork sets of the fork points, with a maximum sum of dynamic boost values; and
    a section for creating a weighted graph in which each fork point in the fork point set represents a node an edge connects fork points in an exclusive relationship, and each node is weighted by the dynamic boost value of a fork point corresponding to the node.

8. The program according to claim 7, wherein the combination determination section includes:
  a section for obtaining a maximum weight independent set of the weighted graph; and
  a section for obtaining a set of fork points corresponding to nodes included in the maximum weight independent set to output the fork point set as a combination of fork points, which are not in an exclusive relationship, with the maximum sum of dynamic boost values.

* * * * *